(12) United States Patent
Hatakeyama et al.

(10) Patent No.: US 9,078,155 B2
(45) Date of Patent: Jul. 7, 2015

(54) COMMUNICATION CONTROL DEVICE, WIRELESS COMMUNICATION SYSTEM, AND WIRELESS COMMUNICATION METHOD FOR CONTROL OF CHANGING TRANSMISSION RATE OF PACKET TO MOBILE STATION

(71) Applicant: FUJITSU LIMITED, Kawasaki-shi, Kanagawa (JP)

(72) Inventors: Shinya Hatakeyama, Yokohama (JP); Yoshie Kitahara, Machida (JP); Akio Ohhashi, Yokohama (JP); Koichiro Higashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 50 days.

(21) Appl. No.: 13/937,610

(22) Filed: Jul. 9, 2013

(65) Prior Publication Data

US 2014/0078897 A1  Mar. 20, 2014

(30) Foreign Application Priority Data

Sep. 19, 2012  (JP) ................ 2012-206258

(51) Int. Cl.
*H04W 28/02* (2009.01)
*H04L 12/825* (2013.01)
*H04L 12/835* (2013.01)

(52) U.S. Cl.
CPC .......... *H04W 28/0289* (2013.01); *H04L 47/25* (2013.01); *H04L 47/263* (2013.01); *H04L 47/30* (2013.01)

(58) Field of Classification Search
CPC .......... H04W 28/021; H04W 28/0289; H04W 28/0284; H04W 72/04; H04W 72/042; H04L 47/25; H04L 47/263; H04L 47/30
USPC ........................................... 370/230
See application file for complete search history.

(56) References Cited

U.S. PATENT DOCUMENTS

| | | | |
|---|---|---|---|
| 7,054,317 B1 * | 5/2006 | Jung et al. ................ | 370/395.1 |
| 2001/0050909 A1 | 12/2001 | Taketsugu | |
| 2006/0221825 A1 * | 10/2006 | Okano ...................... | 370/229 |
| 2010/0177639 A1 * | 7/2010 | Nam .......................... | 370/237 |

FOREIGN PATENT DOCUMENTS

| | | |
|---|---|---|
| JP | 2001-86056 | 3/2001 |
| JP | 2001-160824 | 6/2001 |
| JP | 2001-358763 | 12/2001 |

* cited by examiner

*Primary Examiner* — Anh Ngoc Nguyen
(74) *Attorney, Agent, or Firm* — Fujitsu Patent Center

(57) ABSTRACT

A wireless communication system includes an RNC and a BTS which communicates with the RNC. A congestion-notification transmitting unit of the BTS notifies the RNC of occurrence of congestion in a sector in which a mobile station is located. The RNC includes a congestion-notification receiving unit, a retransmission-ratio monitoring unit, and a transmission-rate control unit. The congestion-notification receiving unit detects the congestion occurrence by the notification from the BTS. The retransmission-ratio monitoring unit monitors a ratio of retransmission of a packet to the mobile station. The transmission-rate control unit performs control of changing a transmission rate of a packet to the mobile station according to the retransmission ratio when the congestion occurrence has been detected by the congestion-notification receiving unit.

6 Claims, 26 Drawing Sheets

FIG.6A

| THRESHOLD | RLC RETRANSMISSION RATIO | RATE-CONTROL RATIO |
|---|---|---|
| UPPER LIMIT THRESHOLD | 30% | 50% |
| LOWER LIMIT THRESHOLD | 15% | NO RATE CONTROL |

FIG.6B

| CONGESTION STATE | BUFFER RETENTION AMOUNT (BY SECTOR) |
|---|---|
| CONGESTION OCCURRENCE THRESHOLD | 80% |
| NON-CONGESTION THRESHOLD | 30% |

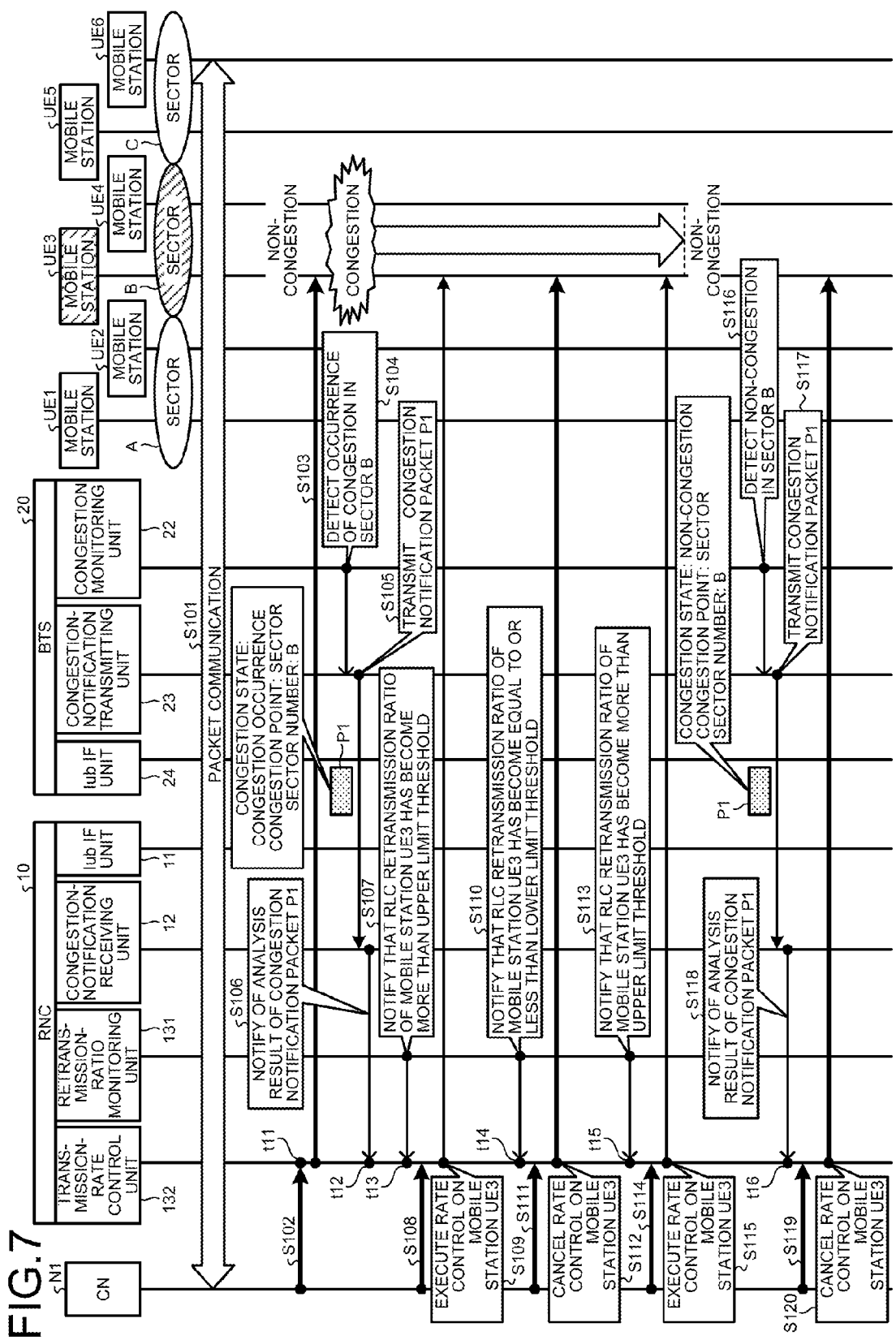

FIG.8

| CONTROL TIMING | CONGESTION STATE OF SECTOR B | RLC RETRANSMISSION RATIO OF MOBILE STATION UE3 | EXECUTION OF RATE CONTROL |
|---|---|---|---|
| t11 | NON-CONGESTION | NOT MORE THAN UPPER LIMIT THRESHOLD | NO |
| t12 | CONGESTION OCCURRENCE | NOT MORE THAN UPPER LIMIT THRESHOLD | NO |
| t13 | CONGESTION OCCURRENCE | MORE THAN UPPER LIMIT THRESHOLD | YES |
| t14 | CONGESTION OCCURRENCE | EQUAL TO OR LESS THAN LOWER LIMIT THRESHOLD | NO |
| t15 | CONGESTION OCCURRENCE | MORE THAN UPPER LIMIT THRESHOLD | YES |
| t16 | NON-CONGESTION | MORE THAN UPPER LIMIT THRESHOLD | NO |

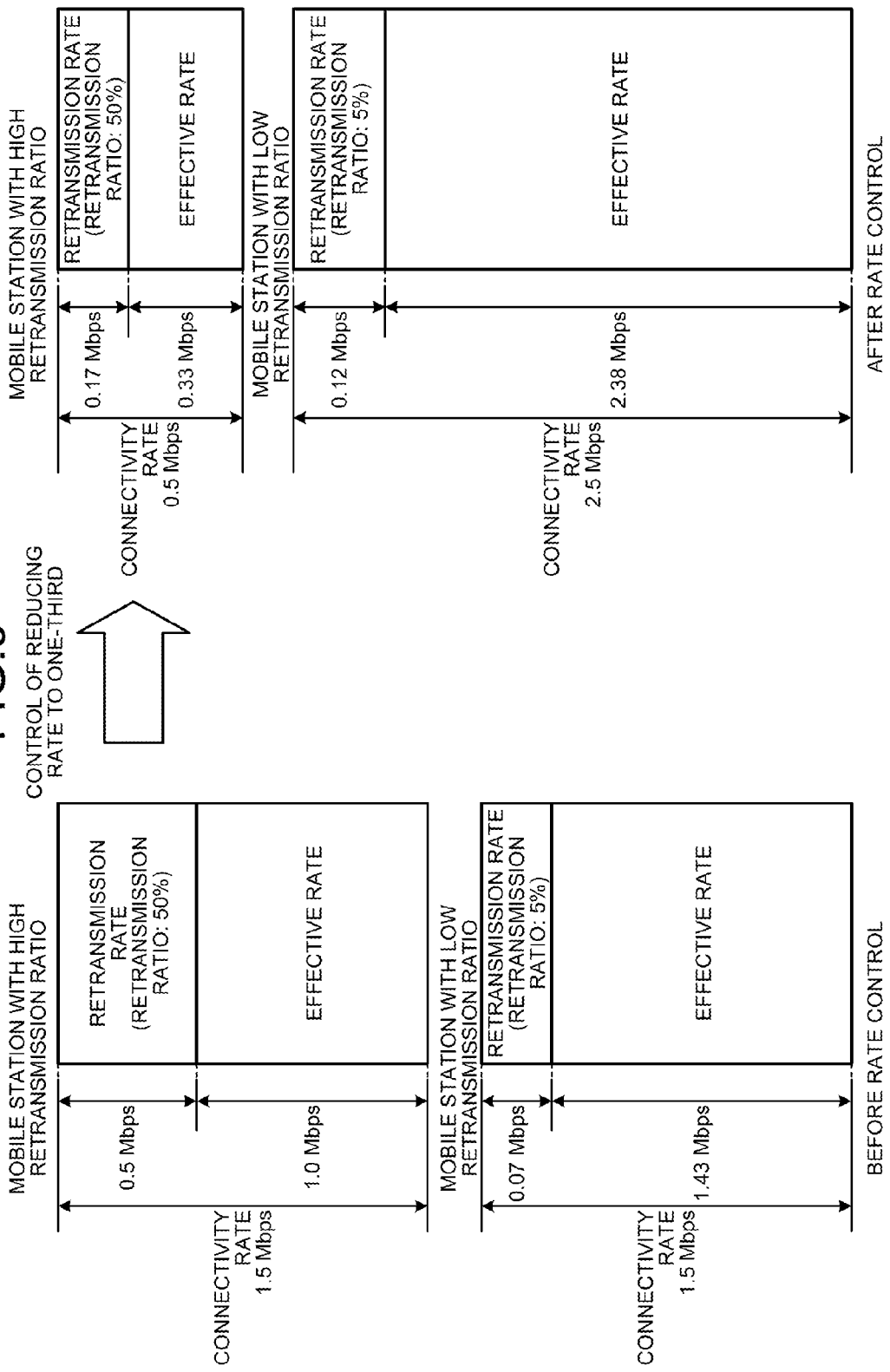

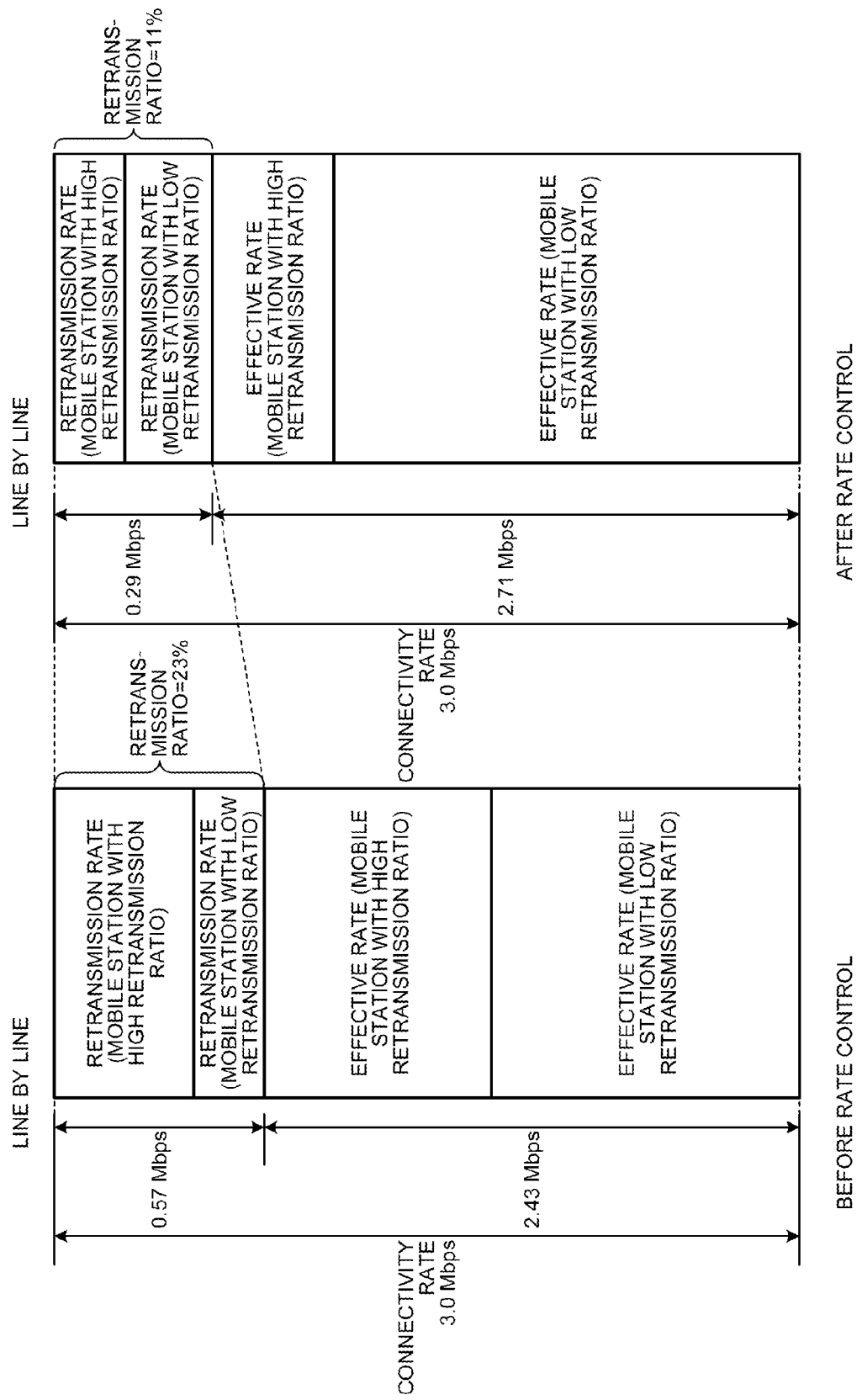

FIG.12

| CONGESTION STATE | BUFFER RETENTION AMOUNT (BY BTS) |
|---|---|
| CONGESTION OCCURRENCE THRESHOLD | 60% |
| NON-CONGESTION THRESHOLD | 20% |

T3

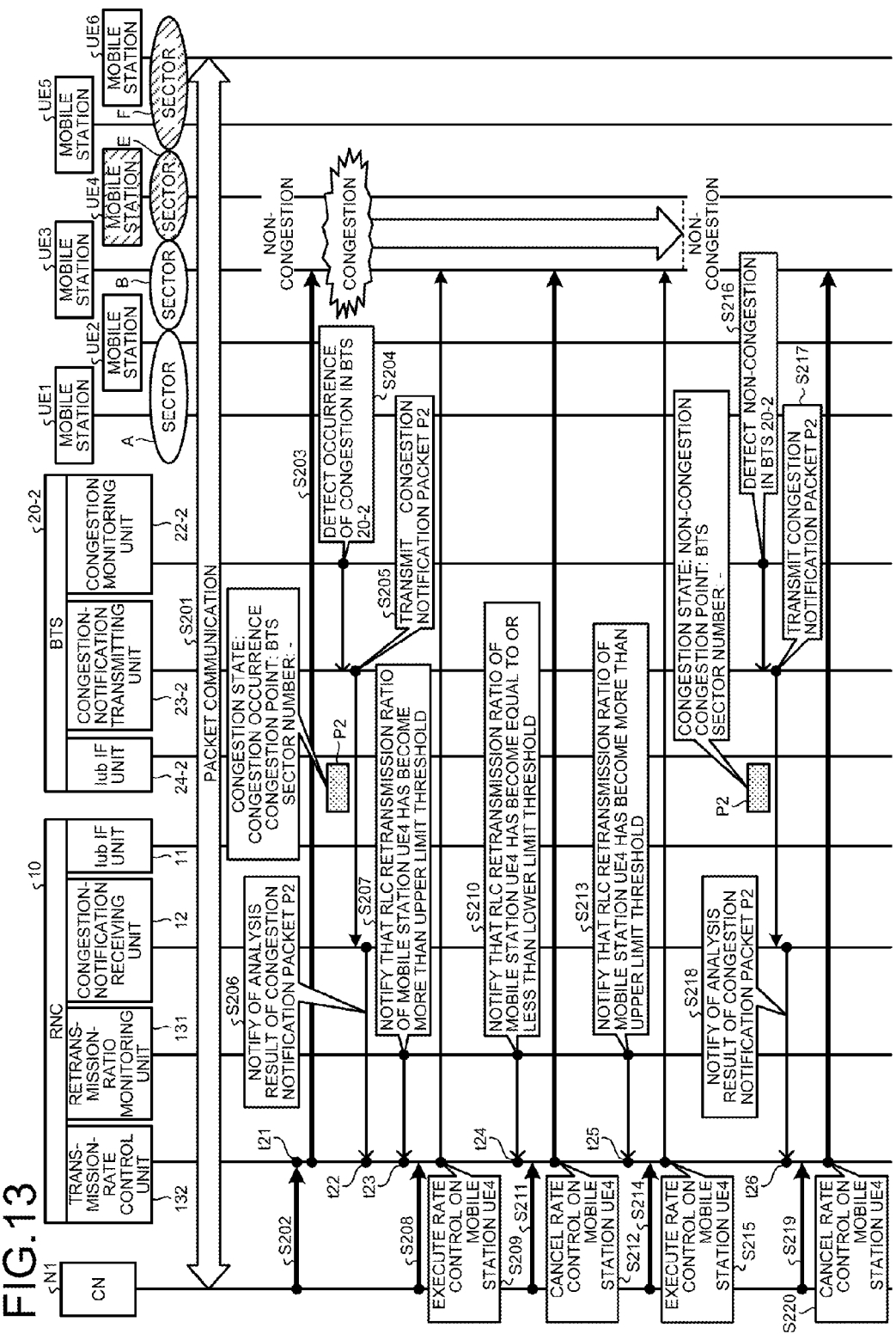

FIG.14

| CONTROL TIMING | CONGESTION STATE OF BTS 20-2 | RLC RETRANSMISSION RATIO OF MOBILE STATION UE4 | EXECUTION OF RATE CONTROL |
|---|---|---|---|
| t21 | NON-CONGESTION | NOT MORE THAN UPPER LIMIT THRESHOLD | NO |
| t22 | CONGESTION | NOT MORE THAN UPPER LIMIT THRESHOLD | NO |
| t23 | CONGESTION | MORE THAN UPPER LIMIT THRESHOLD | YES |
| t24 | CONGESTION | EQUAL TO OR LESS THAN LOWER LIMIT THRESHOLD | NO |
| t25 | CONGESTION | MORE THAN UPPER LIMIT THRESHOLD | YES |
| t26 | NON-CONGESTION | MORE THAN UPPER LIMIT THRESHOLD | NO |

FIG.16

| CONGESTION STATE | BUFFER RETENTION AMOUNT (RNC) |
|---|---|
| CONGESTION OCCURRENCE THRESHOLD | 50% |
| NON-CONGESTION THRESHOLD | 10% |

T4

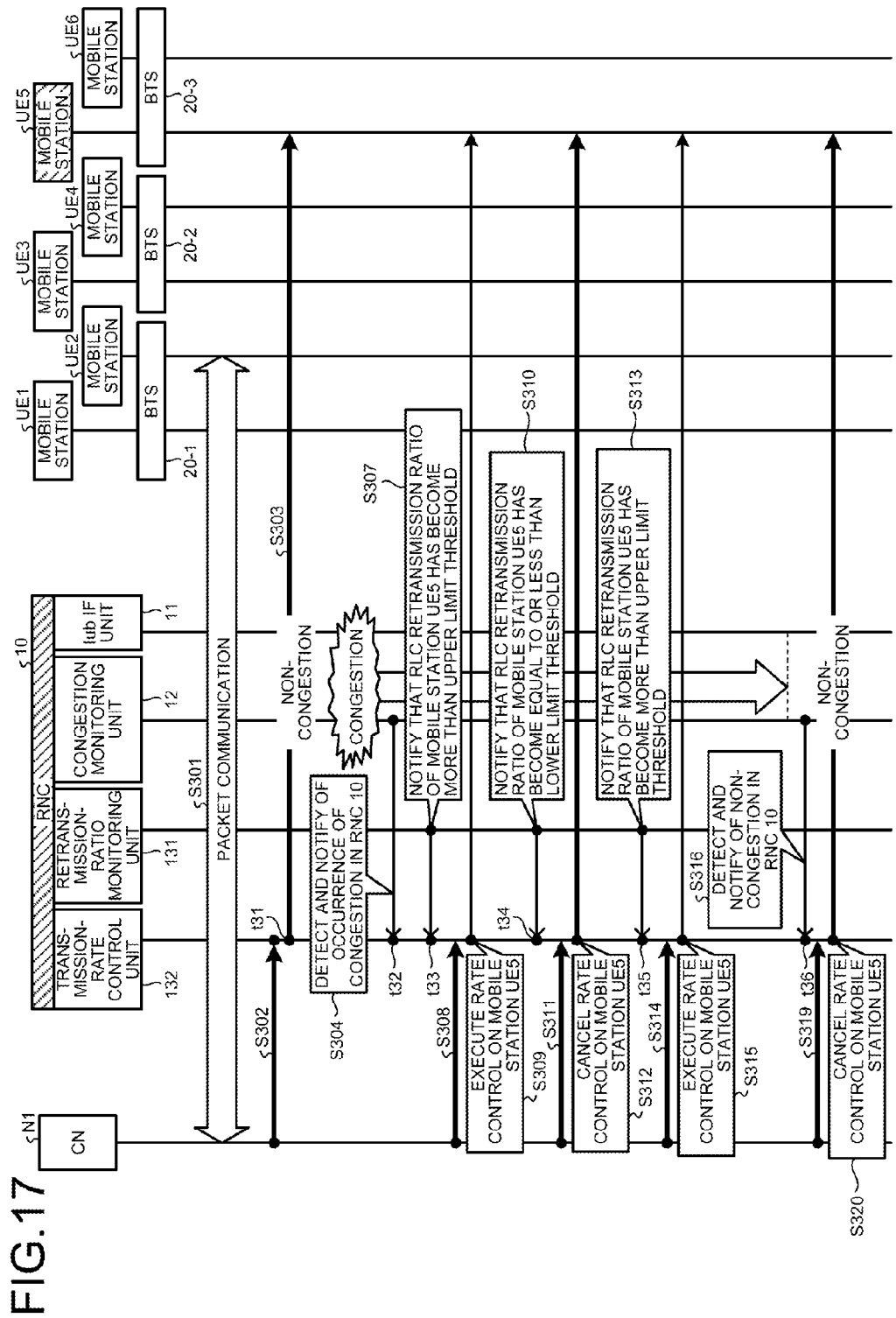

FIG.18

| CONTROL TIMING | CONGESTION STATE OF RNC 10 | RLC RETRANSMISSION RATIO OF MOBILE STATION UE5 | EXECUTION OF RATE CONTROL |
|---|---|---|---|
| t31 | NON-CONGESTION | NOT MORE THAN UPPER LIMIT THRESHOLD | NO |
| t32 | CONGESTION OCCURRENCE | NOT MORE THAN UPPER LIMIT THRESHOLD | NO |
| t33 | CONGESTION OCCURRENCE | MORE THAN UPPER LIMIT THRESHOLD | YES |
| t34 | CONGESTION OCCURRENCE | EQUAL TO OR LESS THAN LOWER LIMIT THRESHOLD | NO |
| t35 | CONGESTION OCCURRENCE | MORE THAN UPPER LIMIT THRESHOLD | YES |
| t36 | NON-CONGESTION | MORE THAN UPPER LIMIT THRESHOLD | NO |

FIG.21

| THRESHOLD | WIRELESS COMMUNICATION QUALITY (Ec/NO) |
|---|---|
| UPPER LIMIT THRESHOLD | $\alpha$ |
| LOWER LIMIT THRESHOLD | $\beta$ |

T5

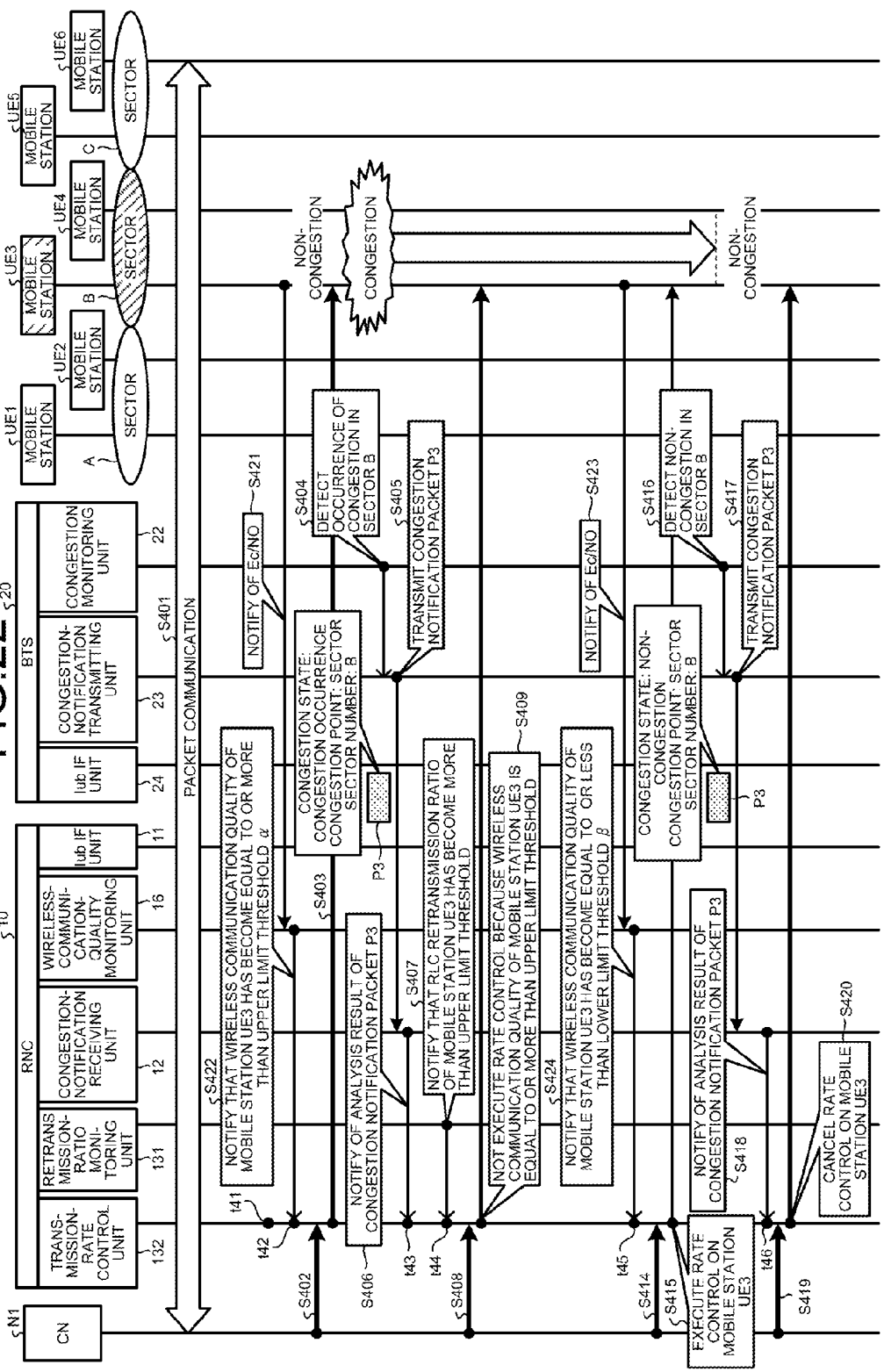

FIG.23

| CONTROL TIMING | CONGESTION STATE OF SECTOR B | RLC RETRANSMISSION RATIO OF MOBILE STATION UE3 | WIRELESS COMMUNICATION QUALITY OF MOBILE STATION UE3 | EXECUTION OF RATE CONTROL |
|---|---|---|---|---|
| t41 | NON-CONGESTION | NOT MORE THAN UPPER LIMIT THRESHOLD | LESS THAN UPPER LIMIT THRESHOLD | NO |
| t42 | NON-CONGESTION | NOT MORE THAN UPPER LIMIT THRESHOLD | EQUAL TO OR MORE THAN UPPER LIMIT THRESHOLD | NO |
| t43 | CONGESTION OCCURRENCE | NOT MORE THAN UPPER LIMIT THRESHOLD | EQUAL TO OR MORE THAN UPPER LIMIT THRESHOLD | NO |
| t44 | CONGESTION OCCURRENCE | LESS THAN LOWER LIMIT THRESHOLD | EQUAL TO OR MORE THAN UPPER LIMIT THRESHOLD | NO |
| t45 | CONGESTION OCCURRENCE | MORE THAN UPPER LIMIT THRESHOLD | EQUAL TO OR LESS THAN LOWER LIMIT THRESHOLD | YES |
| t46 | NON-CONGESTION | MORE THAN UPPER LIMIT THRESHOLD | EQUAL TO OR LESS THAN LOWER LIMIT THRESHOLD | NO |

FIG.27

| CONTROL TIMING | CONGESTION STATE OF SECTOR J | RLC RETRANSMISSION RATIO OF MOBILE STATION UE10 | EXECUTION OF RATE CONTROL |
|---|---|---|---|
| t51 | NON-CONGESTION | NOT MORE THAN UPPER LIMIT THRESHOLD | NO |
| t52 | CONGESTION OCCURRENCE | NOT MORE THAN UPPER LIMIT THRESHOLD | NO |
| t53 | CONGESTION OCCURRENCE | MORE THAN UPPER LIMIT THRESHOLD | YES |
| t54 | CONGESTION OCCURRENCE | EQUAL TO OR LESS THAN LOWER LIMIT THRESHOLD | NO |
| t55 | CONGESTION OCCURRENCE | MORE THAN UPPER LIMIT THRESHOLD | YES |
| t56 | NON-CONGESTION | MORE THAN UPPER LIMIT THRESHOLD | NO |

| CONGESTION STATE | BUFFER RETENTION AMOUNT (BY eNB) |
|---|---|
| CONGESTION OCCURRENCE THRESHOLD | 60% |
| NON-CONGESTION THRESHOLD | 20% |

T7

COMMUNICATION CONTROL DEVICE, WIRELESS COMMUNICATION SYSTEM, AND WIRELESS COMMUNICATION METHOD FOR CONTROL OF CHANGING TRANSMISSION RATE OF PACKET TO MOBILE STATION

CROSS-REFERENCE TO RELATED APPLICATION

This application is based upon and claims the benefit of priority of the prior Japanese Patent Application No. 2012-206258, filed on Sep. 19, 2012, the entire contents of which are incorporated herein by reference.

FIELD

The embodiments discussed herein are related to a communication control device, a wireless communication system, and a wireless communication method.

BACKGROUND

Conventionally, in W-CDMA (Wideband-Code Division Multiple Access), a base-station control device (a radio network controller (RNC)) controls packet transmission between a base station and a mobile station. However, due to degradation of line quality or the like, loss of a packet to be transmitted (packet loss) may sometimes occur between the RNC and the mobile station. Especially, as the base station and the mobile station are connected by a radio link, packet loss may occur frequently depending on a radio wave condition. To cover such packet loss, a W-CDMA wireless communication system has a retransmission function of retransmitting a transmitted packet. Namely, the W-CDMA wireless communication system normally remedies packet loss by retransmission control in the RLC (Radio Link Control) layer, thereby ensuring stable data communication between a mobile station and its higher-level device.

Patent document 1: Japanese Laid-open Patent Publication No. 2001-160824
Patent document 2: Japanese Laid-open Patent Publication No. 2001-358763

However, a line bandwidth between an RNC and a mobile station is the sum of an effective rate used in normal packet communication and a retransmission rate used in retransmission of a packet; therefore, when a ratio of retransmission in the RLC layer is increased with the degradation of line quality or the like, the proportion of an effective rate to the line bandwidth decreases. As a result, line usage efficiency between the RNC and the mobile station is reduced. When there is enough line bandwidth, even if the line usage efficiency is reduced by a certain extent, the RNC can ensure stable data communication by increasing the effective rate. However, when the line bandwidth is tight, such as when there are many mobile stations with high packet retransmission ratios, there is concern that ensuring of stability in data communication becomes difficult due to a decrease in line usage efficiency. The concern is particularly prominent when a line or device is in a congestion state. Incidentally, such a problem may occur in not only a W-CDMA wireless communication system but also an LTE (Long Term Evolution) wireless communication system that controls retransmission between a base station (evolved Node B (eNB)) and a mobile station (User Equipment (UE)).

SUMMARY

According to an aspect of the embodiments, a communication control device includes: a detecting unit that detects occurrence of congestion in an area in which a mobile station is located; a first monitoring unit that monitors a ratio of retransmission of a packet to the mobile station; and a control unit that performs control of changing a transmission rate of a packet to the mobile station according to the retransmission ratio when the congestion occurrence has been detected by the detecting unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6A is a diagram illustrating an example of data storage in an RLC-retransmission-ratio threshold reference table held in a memory of the RNC;

FIG. 6B is a diagram illustrating an example of data storage in a congestion-state threshold reference table held in a memory of the BTS in the first embodiment;

FIG. 7 is a sequence diagram for explaining operation of the wireless communication system according to the first embodiment;

FIG. 8 is a diagram illustrating whether or not to execute rate control at each of timings according to a congestion state of a sector and an RLC retransmission ratio of a mobile station in the first embodiment;

FIG. 9 is a diagram comparing effective rates before and after the rate control with respect to each of mobile stations with different retransmission ratios;

FIG. 10 is a diagram comparing effective rates before and after the rate control on a line-by-line basis;

FIG. 12 is a diagram illustrating an example of data storage in a congestion-state threshold reference table held in a memory of a BTS in the second embodiment;

FIG. 13 is a sequence diagram for explaining operation of the wireless communication system according to the second embodiment;

FIG. 14 is a diagram illustrating whether or not to execute the rate control at each of timings according to a congestion state of a BTS and an RLC retransmission ratio of a mobile station in the second embodiment;

FIG. 16 is a diagram illustrating an example of data storage in a congestion-state threshold reference table held in the memory of the RNC in the third embodiment;

FIG. 17 is a sequence diagram for explaining operation of the wireless communication system according to the third embodiment;

FIG. 18 is a diagram illustrating whether or not to execute the rate control at each of timings according to a congestion state of the RNC and an RLC retransmission ratio of a mobile station in the third embodiment;

FIG. 21 is a diagram illustrating an example of data storage in a wireless-communication-quality threshold reference table held in the memory of the RNC in the fourth embodiment;

FIG. 22 is a sequence diagram for explaining operation of the wireless communication system according to the fourth embodiment;

FIG. 23 is a diagram illustrating whether or not to execute the rate control at each of timings according to a congestion state of a sector and an RLC retransmission ratio and wireless communication quality of a mobile station in the fourth embodiment;

FIG. 27 is a diagram illustrating whether or not to execute the rate control at each of timings according to a congestion state of a sector and an RLC retransmission ratio of a mobile station in the fifth embodiment; and FIG. 28 is a diagram illustrating an example of data storage in a congestion-state threshold reference table held in the memory of the eNB in a variation of the fifth embodiment.

DESCRIPTION OF EMBODIMENTS

Preferred embodiments will be explained with reference to accompanying drawings. Incidentally, the communication control device, the wireless communication system, and the wireless communication method according to the present invention are not limited to the embodiments.

[a] First Embodiment

Figure 1:
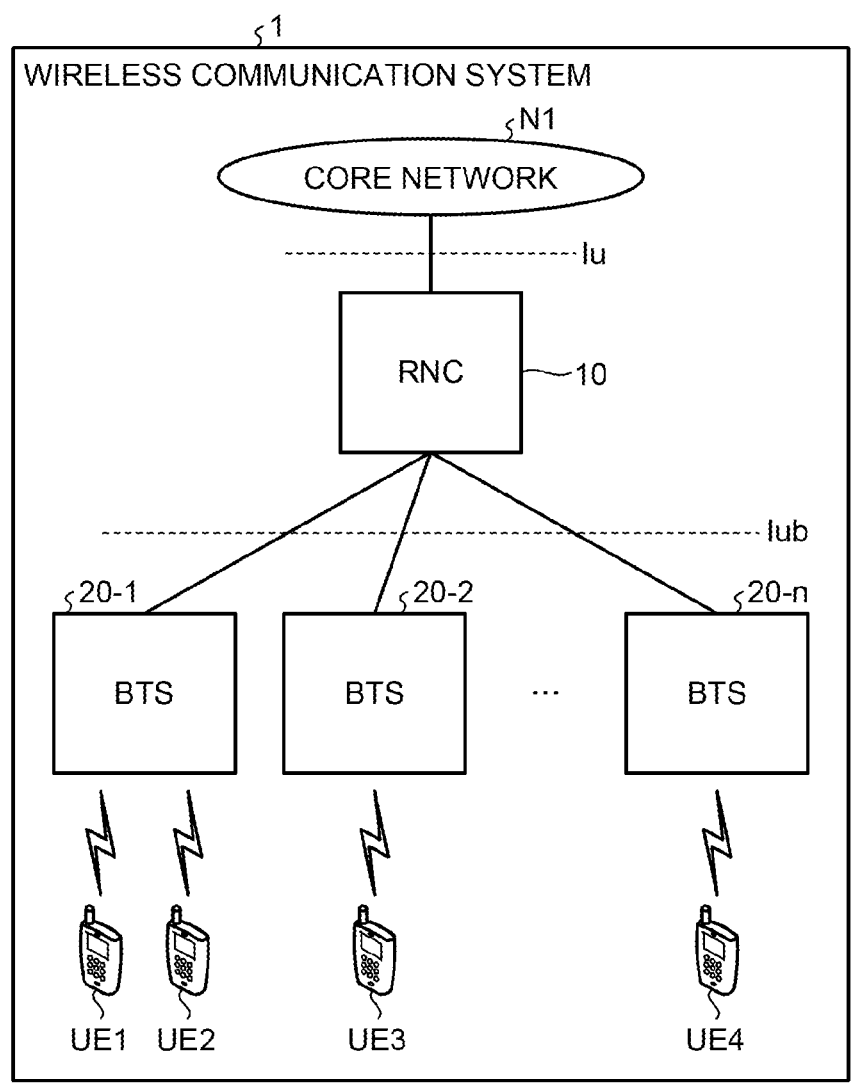
FIG. 1 is a diagram illustrating an overall configuration of a wireless communication system.

First, a configuration of a wireless communication system according to an embodiment of the present invention is explained. FIG. 1 is a diagram illustrating the overall configuration of the wireless communication system. As illustrated in FIG. 1, a wireless communication system 1 includes a core network N1, a radio network controller (RNC) 10, an n (n is a natural number) number of base transceiver stations (BTSs) 20-1, 20-2, ..., and 20-n, and four mobile stations UE1, UE2, UE3, and UE4. The mobile stations UE1, UE2, UE3, and UE4 perform two-way communication with the BTSs 20-1, 20-2, ..., and 20-n, for example, by W-CDMA. The BTSs 20-1, 20-2, ..., and 20-n are connected to the RNC 10 by wired connections, and the RNC 10 is connected to the core network N1, which is a higher-level network, by a wired line. The core network N1, the RNC 10, and the BTSs 20-1, 20-2, ..., and 20-n transmit and receive various signals and data bidirectionally.

Figure 2:
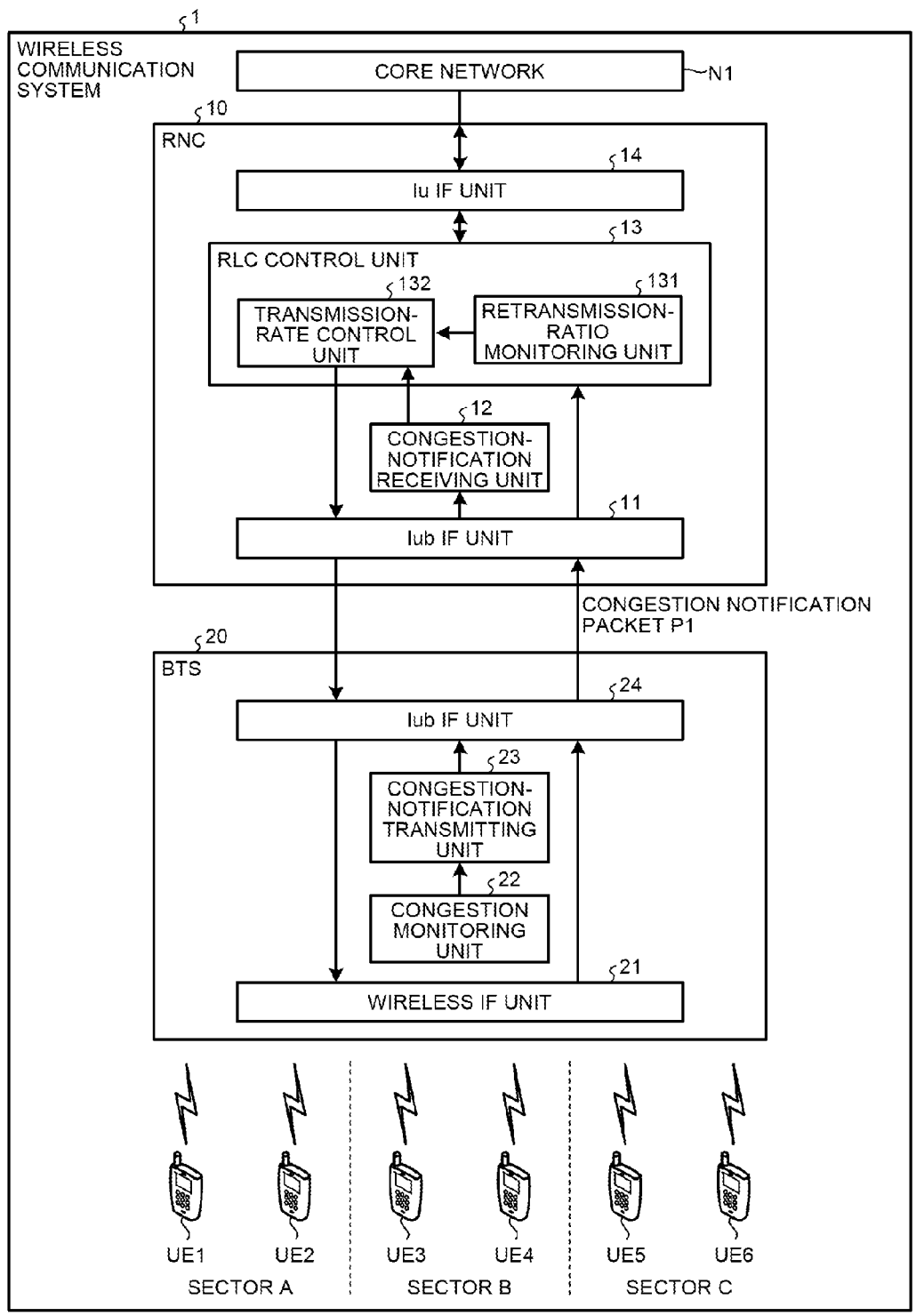
FIG. 2 is a diagram illustrating a functional configuration of a wireless communication system according to a first embodiment.

FIG. 2 is a diagram illustrating a functional configuration of the wireless communication system 1. As illustrated in FIG. 2, the RNC 10, one of components included in the wireless communication system 1, includes an Iub IF unit 11, a congestion-notification receiving unit 12, an RLC control unit 13, and an Iu IF unit 14. These components are connected so that they can input and output a signal or data unidirectionally or bidirectionally. The Iub IF unit 11 performs a process of transmitting a packet to a BTS and a process of receiving a packet from a BTS. When having received a congestion notification packet P1 transmitted from a BTS, the congestion-notification receiving unit 12 analyzes a "congestion state" indicating a congestion occurrence state or a non-congestion state and information on a BTS and a sector which fall into the congestion state, and notifies a transmission-rate control unit 132 of a result of the analysis.

The RLC control unit 13 includes a retransmission-ratio monitoring unit 131 and the transmission-rate control unit 132. The retransmission-ratio monitoring unit 131 monitors a ratio of retransmission in the RLC layer (hereinafter, referred to as an "RLC retransmission ratio" as needed) of each mobile station, and notifies the transmission-rate control unit 132 of a result of comparison of the retransmission ratio with a certain threshold. For example, the retransmission-ratio monitoring unit 131 presets an upper limit threshold and a lower limit threshold, and, when the retransmission ratio has become more than the upper limit threshold, notifies the transmission-rate control unit 132 of "more than the threshold". On the other hand, when the retransmission ratio has made the transition from a state of being more than the threshold to a state of being equal to or less than the lower limit threshold, the retransmission-ratio monitoring unit 131 notifies the transmission-rate control unit 132 of "equal to or less than the threshold".

The transmission-rate control unit 132 controls a transmission rate of a mobile station with a high retransmission ratio based on information input from the congestion-notification receiving unit 12 and the retransmission-ratio monitoring unit 131. When having been notified of the occurrence of congestion by the congestion-notification receiving unit 12, the transmission-rate control unit 132 performs rate control on a mobile station which is held in a sector where the congestion has occurred and of which the retransmission ratio has become more than the upper limit threshold. This rate control is executed based on a ratio of a connectivity rate to an upper limit. The connectivity rate here means an entire line bandwidth that a mobile station can use. For example, when an upper limit of a connectivity rate is 1 Mbps, and a rate of the rate control on a mobile station with a high retransmission ratio is defined as 50%, the upper limit of the connectivity rate is controlled to be reduced to 0.5 Mbps. Furthermore, when having been notified of non-congestion by the congestion-notification receiving unit 12, the transmission-rate control unit 132 cancels the above-described rate control. The Iu IF unit 14 performs a process of transmitting a packet to the core network N1 and a process of receiving a packet transmitted from the core network N1.

Subsequently, a configuration of the BTS provided as a base station is explained; hereinafter, for convenience of the explanation, the BTSs 20-1, 20-2, ..., and 20-n are collectively described as the BTS 20. The BTS 20 includes a wireless IF unit 21, a congestion monitoring unit 22, a congestion-notification transmitting unit 23, and an Iub IF unit 24. These components are connected so that they can input and output a signal or data unidirectionally or bidirectionally. The wireless IF unit 21 performs a process of transmitting a packet to mobile stations UE1 to UE6 (for example, a process of converting from a digital signal to a wireless signal) and a process of receiving a packet transmitted from the mobile stations UE1 to UE6 (for example, a process of converting from a wireless signal to a digital signal). The congestion monitoring unit 22 monitors a congestion state of the BTS 20 with respect to each sector. For example, when the congestion monitoring unit 22 has determined that a sector A is in a congestion occurrence state, the congestion monitoring unit 22 notifies the congestion-notification transmitting unit 23 of "occurrence of congestion" and "A" which is an identifier of the sector where the congestion has occurred. Also when the congestion monitoring unit 22 has determined that it is in a non-congestion state, the congestion monitoring unit 22 notifies the congestion-notification transmitting unit 23 of "non-congestion". When the congestion-notification transmitting unit 23 has received notification of a congestion state or a non-congestion state from the congestion monitoring unit 22, the congestion-notification transmitting unit 23 transmits a congestion notification packet P1 indicating the state to the RNC 10. The Iub IF unit 24 performs a process of transmitting a packet to the RNC and a process of receiving a packet transmitted from the RNC.

Figure 3:
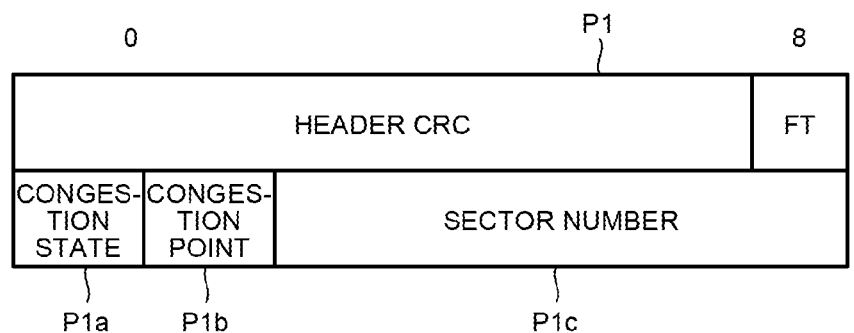
FIG. 3 is a diagram illustrating a frame format of a congestion notification packet transmitted from a BTS to an RNC.

FIG. 3 is a diagram illustrating a frame format of the congestion notification packet P1 transmitted from the BTS 20 to the RNC 10. As illustrated in FIG. 3, the congestion notification packet P1 has a congestion-state storage area P1a, a congestion-point storage area P1b, and a sector-number storage area P1c. The congestion-state storage area P1a is an information storage area indicating either non-congestion state (normal state) or congestion occurrence state a state notified to the RNC 10 by the BTS 20 is. For example, when a value of "0" is set in the congestion-state storage area P1a, the notified congestion state is "non-congestion state"; when a value of "1" is set, the notified congestion state is "congestion occurrence state". The congestion-point storage area P1b is an information storage area indicating a point where congestion has occurred (a congestion point) when the congestion state is "congestion occurrence state". For example, when a value of "0" is set in the congestion-point storage area P1b, a congestion point is a "BTS"; when a value of "1" is set, a congestion point is a "sector". The sector-number storage area P1c is an information storage area indicating an identification number of a sector where congestion has occurred. For example, when a value of "#2" is set in the sector-number storage area P1c, it is indicated that congestion has occurred in a "sector C of the BTS 20-1"; when a value of "#4 to #6" is set in the sector-number storage area P1c, it is indicated that congestion has occurred in "sectors E, F, and G of the BTS 20-2". The RNC 10 can easily grasp which sector of which BTS is in what congestion state by reference to a congestion notification packet P1 received from the BTS 20.

Figure 4:
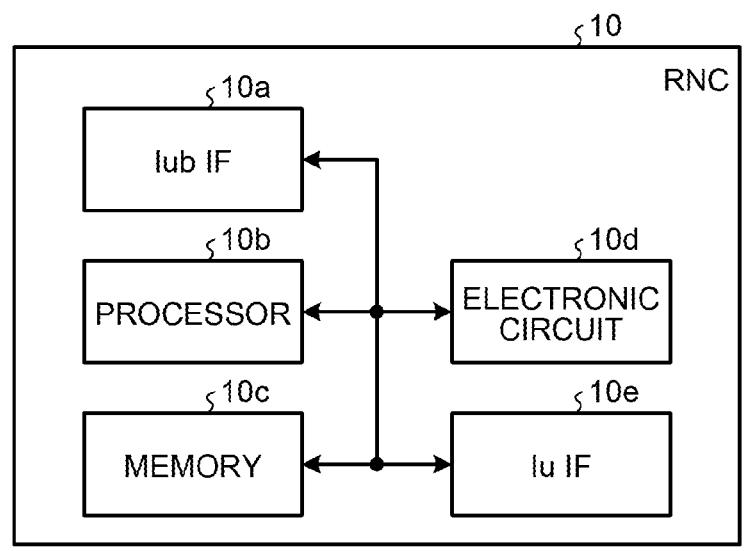
FIG. 4 is a diagram illustrating a hardware configuration of the RNC.

Subsequently, a hardware configuration of the wireless communication system 1 is explained with reference to FIGS. 4 and 5. FIG. 4 is a diagram illustrating a hardware configuration of the RNC 10. As illustrated in FIG. 4, the RNC 10 includes an Iub IF 10a, a processor 10b, a memory 10c, an electronic circuit 10d, and an Iu IF 10e as hardware components. These components are connected so that they can input and output a signal or data unidirectionally or bidirectionally.

The Iub IF 10a is an interface device for performing wire communication with the BTS 20 via a wired line. The processor 10b is a device for processing data, and includes, for example, a central processing unit (CPU) and a digital signal processor (DSP), etc. The memory 10c is a device for storing data, and includes, for example, a random access memory (RAM) and a read-only memory (ROM), etc. The electronic circuit 10d includes, for example, a large-scale integration (LSI), a field programmable gate array (FPGA), and an application specific integrated circuit (ASIC), etc. The Iu IF 10e is an interface device for performing wire communication with a higher-level device of the core network (for example, serving/gateway GPRS Support Node (xGSN)) via a wired line connected to a network-side network.

Furthermore, because of a correspondence relation between the functional configuration and the hardware configuration of the RNC 10, the Iub IF unit 11 is realized by the above-described Iub IF 10a. The congestion-notification receiving unit 12, the retransmission-ratio monitoring unit 131, and the transmission-rate control unit 132 are realized by the above-described processor 10b. The Iu IF unit 14 is realized by the above-described Iu IF 10e.

Figure 5:
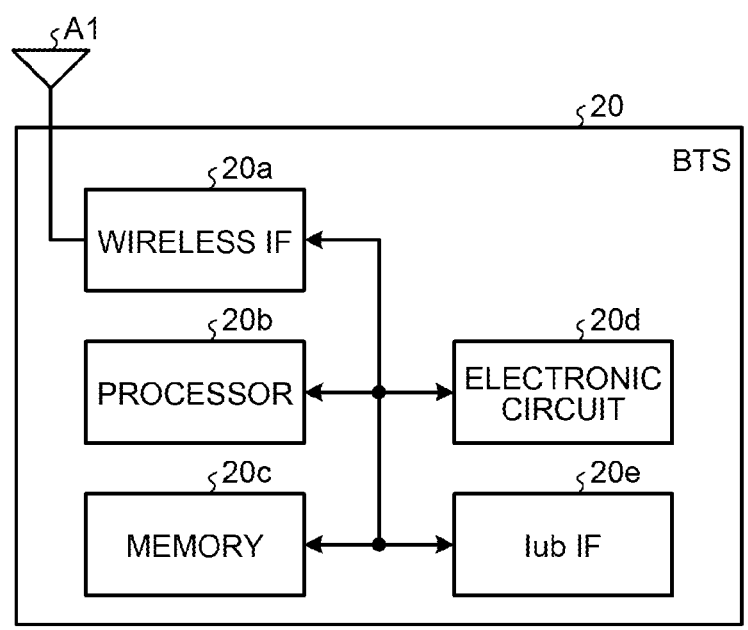
FIG. 5 is a diagram illustrating a hardware configuration of the BTS.

FIG. 5 is a diagram illustrating a hardware configuration of the BTS 20. As illustrated in FIG. 5, the BTS 20 includes a wireless IF 20a, a processor 20b, a memory 20c, an electronic circuit 20d, and an Iub IF 20e as hardware components. These components are connected so that they can input and output a signal or data unidirectionally or bidirectionally.

The wireless IF 20a is an interface device for performing wireless communication with the mobile stations UE1 to UE6, and includes, for example, an antenna A1. The processor 20b is a device for processing data, and includes, for example, a CPU and a DSP, etc. The memory 20c is a device for storing data, and includes, for example, a RAM and a ROM, etc. The electronic circuit 20d includes, for example, an LSI, an FPGA, and an ASIC, etc. The Iub IF 20e is an interface device for performing wire communication with the RNC 10 via a wired line.

Furthermore, because of a correspondence relation between the functional configuration and the hardware configuration of the BTS 20, the wireless IF unit 21 is realized by the above-described wireless IF 20a. The congestion monitoring unit 22 and the congestion-notification transmitting unit 23 are realized by the above-described processor 20b. The Iub IF unit 24 is realized by the above-described Iub IF 20e.

Here, an RLC retransmission ratio serving as a trigger of the rate control and a retention amount of a transmission buffer (hereinafter, referred to as a "transmission buffer retention amount") serving as a trigger of notification of a congestion state are explained as prerequisites for explanation of the operation. FIG. 6A is a diagram illustrating an example of data storage in an RLC-retransmission-ratio threshold reference table T1 held in the memory 10c of the RNC 10. An RLC retransmission ratio is a ratio of the number of retransmitted PDUs to the number of transmitted PDUs by protocol data unit (PDU). For example, when the BTS 20 has transmitted 100 RLC PDUs to the UE1, but 20 of the 100 RLC PDUs failed to be delivered, i.e., the number of retransmitted PDUs is 20, an RLC retransmission ratio is "20%". This RLC retransmission ratio is calculated for RLC PDUs transmitted within a certain time (for example, the last 1 second) as objects, and is calculated with a certain period (for example, with a period of 100 milliseconds).

As illustrated in FIG. 6A, in the RLC-retransmission-ratio threshold reference table T1, "30%" has been set as an upper limit threshold of an "RLC retransmission ratio" serving as a trigger to start the rate control, and "15%" has been set as a lower limit threshold of the "RLC retransmission ratio" serving as a trigger to cancel the rate control. Furthermore, a "rate-control ratio" of "50%" has been set to be associated with the upper limit threshold of "30%". Therefore, when the transmission-rate control unit 132 of the RNC 10 has received notification that an RLC retransmission ratio of the mobile station UE1 has become more than "30%" from the retransmission-ratio monitoring unit 131, the transmission-rate control unit 132 performs the control on the mobile station UE1 to reduce the rate by "50%". On the other hand, "no rate control" has been set to be associated with the lower limit threshold of "15%". Therefore, when the transmission-rate control unit 132 of the RNC 10 has received notification that the RLC retransmission ratio of the mobile station UE1 has become "15%" or less from the retransmission-ratio monitoring unit 131, the transmission-rate control unit 132 stops (cancels) the rate control on the mobile station UE1. As a result, the "rate-control ratio" of the mobile station UE1 returns from "50%" to an initial value of "100%". Incidentally, respective set values in the RLC-retransmission-ratio threshold reference table T1 can be arbitrarily changed according to the number of mobile stations of which the RLC retransmission ratio has become more than the upper limit threshold, an amount of traffic, or an available capacity of the wireless communication system 1, etc.

FIG. 6B is a diagram illustrating an example of data storage in a congestion-state threshold reference table T2 held in the memory 20c of the BTS 20. A congestion state of each sector is defined by a transmission buffer retention amount that the BTS 20 uses on a sector-by-sector basis. As illustrated in FIG. 6B, in the congestion-state threshold reference table T2, "80%" has been set as a "congestion occurrence threshold" indicating an upper limit threshold of a sector-specific transmission buffer retention amount, and "30%" has been set as a "non-congestion threshold" indicating a lower limit threshold of the transmission buffer retention amount. The congestion monitoring unit 22 of the BTS 20 monitors a transmission buffer retention amount with a certain period (for example, with a period of 100 milliseconds). When a transmission buffer retention amount of a sector has become more than the congestion occurrence threshold of "80%" the certain number of times in a row (for example, in three consecutive periods), the congestion monitoring unit 22 determines that the sector is in a "congestion occurrence state". On the other hand, when a sector is in a "congestion occurrence state", if a transmission buffer retention amount of the sector has become equal to or less than the non-congestion threshold of "30%" the certain number of times in a row (for example, in three consecutive periods), the congestion monitoring unit 22 determines that the sector has fallen into a "non-congestion state". Incidentally, respective set values in the congestion-state threshold reference table T2 can be arbitrarily changed according to the number of sectors of which the transmission buffer retention amount has become more than the congestion occurrence threshold (the upper limit threshold), an amount of traffic, or the capacity of a transmission buffer, etc.

Subsequently, operation of the wireless communication system 1 is explained. In the present embodiment, an operating sequence of the wireless communication system 1 on execution of the rate control on the mobile station UE3 is explained particularly based on the assumption that a congestion state of a sector B illustrated in FIG. 2 makes the transition from "non-congestion state" to "congestion occurrence state", and then makes the transition to "non-congestion state" again. FIG. 7 is a sequence diagram for explaining the operation of the wireless communication system 1 according to the first embodiment. In FIG. 7, the mobile station UE3 in the sector B marked with diagonal lines is an object of transmission-rate reduction control in the present operating sequence.

First, at S101, the core network N1 and the mobile stations UE1 to UE6 perform packet transmission and reception via the RNC 10 and the BTS 20. The mobile stations UE1 and UE2 are located in a sector A composing a part of a communication area (cell) of the BTS 20. Likewise, the mobile stations UE3 and UE4 are located in the sector B, and the mobile stations UE5 and UE6 are located in a sector C. A packet addressed to the mobile station UE3, which has been transmitted from the core network N1 at S102, reaches the mobile station UE3 located in the sector B through the RNC 10 and the BTS 20 (S103). At this time, as a congestion state of the sector B is "non-congestion state", the rate control by the transmission-rate control unit 132 is not executed.

After that, when congestion has occurred in the sector B, and the congestion monitoring unit 22 of the BTS 20 has detected the congestion which has occurred in the sector B (S104), the congestion monitoring unit 22 instructs the congestion-notification transmitting unit 23 to transmit a congestion notification packet P1 (a dotted part in FIG. 7). In accordance with the instruction, the congestion-notification transmitting unit 23 transmits a congestion notification packet P1 to the RNC 10 (S105). In the congestion notification packet P1, a "congestion occurrence" state as a congestion state P1a, "sector" as a congestion point P1b, and "B" as a sector number P1c have been set.

When the congestion-notification receiving unit 12 has received the congestion notification packet P1, the RNC 10 detects the occurrence of congestion by the receipt of the congestion notification packet P1. Then, the congestion-notification receiving unit 12 notifies the transmission-rate control unit 132 of the occurrence of congestion in the sector B as a result of analysis of the congestion notification packet P1 (S106). When having received the notification, the transmission-rate control unit 132 detects that the sector B of the BTS 20 is currently in a congestion occurrence state, and as a result, the mobile stations UE3 and UE4 held in the sector B become candidates for a rate controlled object.

At S107, the retransmission-ratio monitoring unit 131 of the RNC 10 notifies the transmission-rate control unit 132 that an RLC retransmission ratio of the mobile station UE3 has become more than the upper limit threshold. Accordingly, the transmission-rate control unit 132 detects that the mobile station UE3 under the sector B has become more than the upper limit threshold of the retransmission ratio, and as a result, the mobile station UE3 out of the candidates for a rate controlled object (the mobile stations UE3 and UE4) is determined to be a mobile station subject to rate control.

Since then, when a packet addressed to the mobile station UE3, which has been transmitted from the core network N1, has been received by the RNC 10 (S108), the transmission-rate control unit 132 causes the Iub IF unit 11 to transmit the packet addressed to the mobile station UE3 at a lower rate than the transmission rate at S103 (for example, 50%) (S109).

Incidentally, like the mobile station UE3, the mobile station UE4 is also located in the sector B being in the congestion occurrence state, so the mobile station UE4 is a rate controlled object; however, an RLC retransmission ratio of the mobile station UE4 is not more than the upper limit threshold, and therefore, the rate control on the mobile station UE4 is not executed.

At S110, the retransmission-ratio monitoring unit 131 of the RNC 10 notifies the transmission-rate control unit 132 that the RLC retransmission ratio of the mobile station UE3 has become equal to or less than the lower limit threshold. With this, when the RNC 10 transfers a new packet received from the core network N1 to the mobile station UE3 (S111), the RNC 10 cancels the rate control on the mobile station UE3 started at S109 (S112). Accordingly, the transmission rate of a packet from the RNC 10 to the mobile station UE3 returns from a state in which a rate-control ratio has been reduced, for example, to 50% to an initial state in which the rate-control ratio is 100%.

After that, when the retransmission-ratio monitoring unit 131 of the RNC 10 notifies the transmission-rate control unit 132 that the RLC retransmission ratio of the mobile station UE3 has again become more than the upper limit threshold (S113), the transmission-rate control unit 132 determines the mobile station UE3 to be a mobile station subject to the rate control. Since then, a packet addressed to the mobile station UE3 that the RNC 10 has received from the core network N1 (S114) is transmitted from the Iub IF unit 11 of the RNC 10 to the mobile station UE3 at a lower rate controlled to be reduced by the transmission-rate control unit 132 (for example, 50%) (S115).

After that, when the congestion of the sector B has been cancelled, and the congestion monitoring unit 22 of the BTS 20 has detected a non-congestion state of the sector B (S116), the congestion monitoring unit 22 instructs the congestion-notification transmitting unit 23 to transmit a congestion notification packet P1. In accordance with the instruction, the congestion-notification transmitting unit 23 transmits a congestion notification packet P1 to the RNC 10 (S117). In the congestion notification packet P1, unlike at S105, a "non-congestion" state as a congestion state P1a, "sector" as a congestion point P1b, and "B" as a sector number P1c have been set.

When the congestion-notification receiving unit 12 has received the congestion notification packet P1, the RNC 10 detects cancellation of the congestion by the receipt of the congestion notification packet P1. Then, the congestion-notification receiving unit 12 notifies the transmission-rate control unit 132 of the cancellation of the congestion in the sector B as a result of analysis of the congestion notification packet P1 (S118). When having received the notification, the transmission-rate control unit 132 detects that the sector B of the BTS 20 is currently in a non-congestion state. As a result, the mobile stations UE3 and UE4 currently held in the sector B are both excluded from candidates for a rate controlled object.

Since then, when the RNC 10 transfers a new packet received from the core network N1 to the mobile station UE3 (S119), the RNC 10 cancels the rate control on the mobile station UE3 started at Step S115 (S119) and transmits the packet to the mobile station UE3 at the same rate as before the congestion occurrence (the rate-control ratio of 100%).

FIG. 8 is a diagram illustrating whether or not to execute the rate control at each of timings according to a congestion state of the sector B and an RLC retransmission ratio of the mobile station UE3 in the first embodiment. As illustrated in FIG. 8, out of control timings t11 to t16 illustrated in FIG. 7, at the timings t11 and t16 at which a "congestion state of the sector B" is a "non-congestion state" or the timings t11, t12, and t14 at which an "RLC retransmission ratio of the mobile station UE3" is "not more than the upper limit threshold", the rate control is not executed, and the rate control is executed at the timings t13 and t15 only. Namely, when a "congestion state of the sector B" is a "congestion occurrence" state and an "RLC retransmission ratio of the mobile station UE3" is "more than the upper limit threshold", the transmission-rate control unit 132 of the RNC 10 performs the control of reducing a transmission rate of a packet addressed to the mobile station UE3.

As explained above, the wireless communication system 1 according to the first embodiment includes the RNC 10 and the BTS 20 which communicates with the RNC 10. The congestion-notification transmitting unit 23 of the BTS 20 notifies the RNC 10 of occurrence of congestion in the sector B in which the mobile station UE3 is located. The RNC 10 includes the congestion-notification receiving unit 12, the retransmission-ratio monitoring unit 131, and the transmission-rate control unit 132. The congestion-notification receiving unit 12 detects the congestion occurrence by the notification from the BTS 20. The retransmission-ratio monitoring unit 131 monitors a ratio of retransmission of a packet to the mobile station UE3. The transmission-rate control unit 132 performs the control of changing a transmission rate (transmission speed) of a packet to the mobile station UE3 according to the retransmission ratio when the congestion occurrence has been detected by the congestion-notification receiving unit 12. The transmission-rate control unit 132 performs the control on the mobile station UE3, for example, so that the higher the retransmission ratio, the lower the transmission rate.

As described above, the wireless communication system 1 monitors an RLC retransmission ratio with respect to each mobile station, and executes the rate control on a mobile station of which the RLC retransmission ratio has become more than a certain upper limit threshold. At this time, if the wireless communication system 1 executes the rate control even in a case where a line is not in a congestion state, respective effective rates of the mobile stations UE1 to UE6 are reduced, which offers no advantage; therefore, only on an object of which the line is in a congestion state, the wireless communication system 1 executes the rate control according to an RLC retransmission ratio. For example, the wireless communication system 1 performs the reduction control of an upper limit of a packet rate of a mobile station with a high RLC retransmission ratio at a fixed rate. After that, when the RLC retransmission ratio has been dropped to a lower limit threshold or less in a state where the packet rate is reduced, the wireless communication system 1 cancels the reduction control of the packet rate of the mobile station. Furthermore, also when the controlled object has returned from the congestion state to a normal state, the wireless communication system 1 cancels the rate control.

Effects achieved by the wireless communication system 1 are explained below with reference to FIGS. 9 and 10. The wireless communication system 1 monitors congestion in each certain range out of sectors, the BTS 20, and the RNC 10 (particularly, in each of the sectors in the present embodiment), and if there is congestion, executes the rate control on a mobile station with a high retransmission ratio within the range. Consequently, the wireless communication system 1 can reduce the ratio of retransmission of a packet to the line bandwidth between the RNC 10 and the mobile stations UE1 to UE6. As a result, line usage efficiency can be improved.

FIG. 9 is a diagram comparing effective rates before and after the rate control with respect to each of mobile stations with different retransmission ratios. FIG. 10 is a diagram comparing effective rates before and after the rate control on a line-by-line basis. In FIGS. 9 and 10, the above-described connectivity rate (an entire line bandwidth that a mobile station can use) is represented by the sum of an effective rate and a retransmission rate. In both diagrams, with a reduction in a packet rate of a mobile station with a high RLC retransmission ratio, a wireless band unoccupied by the reduction is added to usable wireless bands. Therefore, the wireless communication system 1 can allocate the wireless bands to mobile stations with low retransmission ratios which are not an object of the rate control. As a result, as illustrated in FIGS. 9 and 10, the proportion of a retransmission rate to the connectivity rate becomes lower than before the control, and an effective rate is increased by this.

For example, as illustrated in FIG. 9, based on an assumption that a retransmission ratio of a mobile station with a high retransmission ratio is 50%, when a connectivity rate is 1.5 Mbps, a retransmission rate of the mobile station with the high retransmission ratio is calculated to be 0.5 Mbps. Therefore, the remaining 1.0 Mbps (=1.5 Mbps-0.5 Mbps) is an effective rate that the mobile station with the high retransmission ratio uses. Likewise, based on an assumption that a retransmission ratio of a mobile station with a low retransmission ratio is 5%, when the connectivity rate is 1.5 Mbps, a retransmission rate of the mobile station with the low retransmission ratio is calculated to be about 0.07 Mbps. Therefore, the remaining about 1.43 Mbps is an effective rate that the mobile station with the low retransmission ratio uses. After that, the RLC control unit 13 of the RNC 10 performs the control of reducing the connectivity rate of the mobile station with the high retransmission ratio to one-third of the connectivity rate. As the retransmission ratios (50%, 5%) are maintained also after the control, the retransmission rate of the mobile station with the high retransmission ratio is reduced to about 0.17 Mbps by the one-third reduction control. On the other hand, the retransmission rate of the mobile station with the low retransmission ratio is increased to about 0.12 Mbps, but the effective rate is also increased from about 1.43 Mbps to about 2.38 Mbps; therefore, on the whole, the effective rate is increased. Namely, an increase in the effective rate of the mobile station with the low retransmission ratio which has a high effective rate exceeds a reduction in the effective rate of the mobile station with the high retransmission ratio which has a low effective rate; therefore, the proportion of the effective rate to the entire line bandwidth (the connectivity rate) is increased.

For example, as illustrated in FIG. 10, an effective rate which was about 2.43 Mbps before execution of reduction control on a mobile station with a high retransmission ratio is increased to about 2.71 Mbps after the execution of the reduction control. In addition, the proportion of the effective rate to the entire line bandwidth (the connectivity rate) is also increased from about 0.81 (=2.433.0) to about 0.90 (=2.713.0) after the execution of the reduction control. With this, the retransmission ratio is reduced from about 23% to about 11%. Therefore, out of the entire line bandwidth, a line band used in retransmission of a packet is reduced, and the reduced portion can be allocated for a line band used in normal packet transmission. As a result, line usage efficiency is improved.

[b] Second Embodiment

Figure 11:
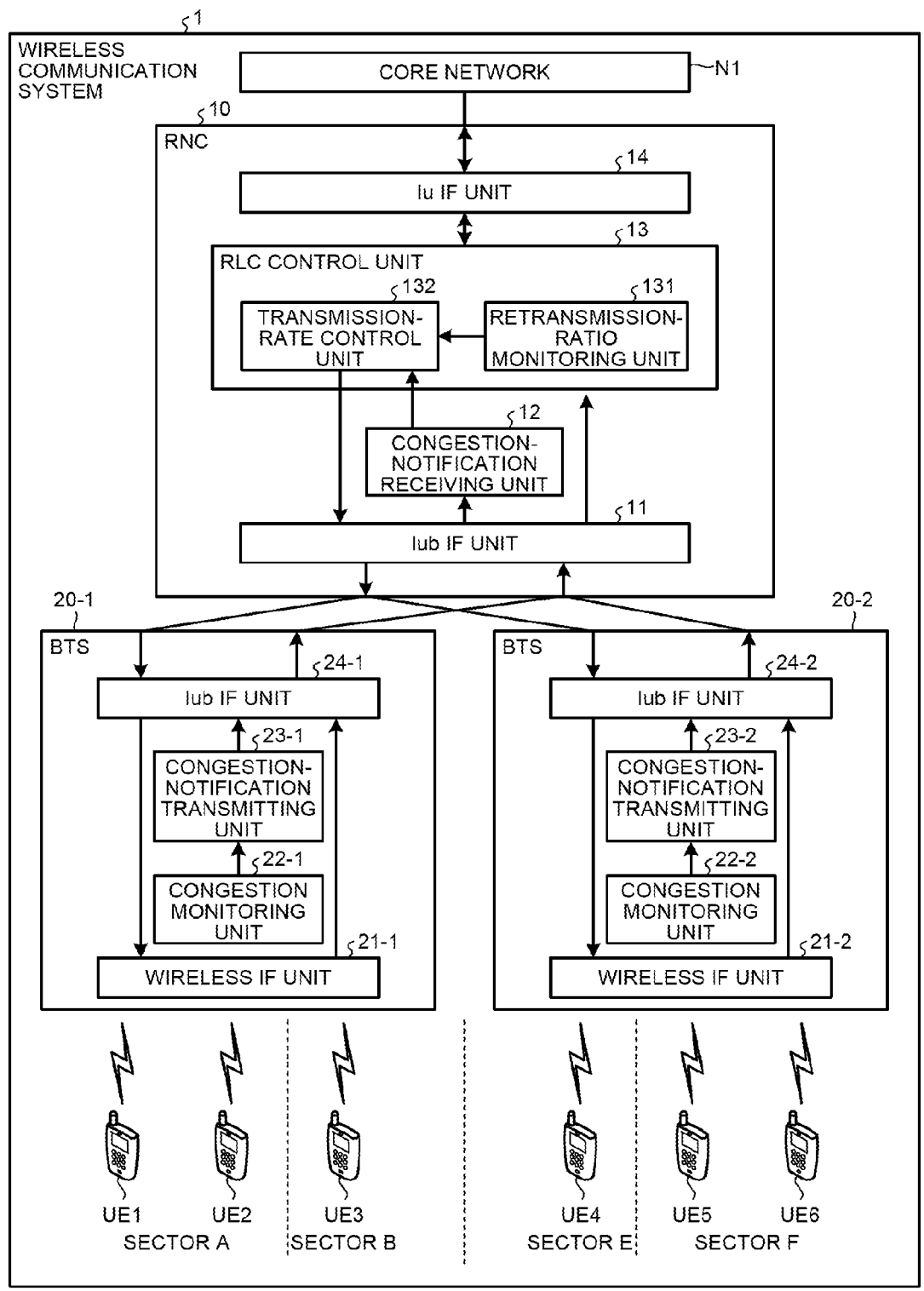
FIG. 11 is a diagram illustrating a functional configuration of a wireless communication system according to a second embodiment.

Subsequently, a second embodiment is explained. A wireless communication system according to the second embodiment has the same configuration as the wireless communication system in the first embodiment illustrated in FIG. 2. Furthermore, an RNC and a BTS in the second embodiment have the same configurations as the RNC 10 and the BTS 20 in the first embodiment illustrated in FIG. 2, respectively. FIG. 11 is a diagram illustrating a functional configuration of the wireless communication system 1 according to the second embodiment. As illustrated in FIG. 11, in the second embodiment, a component in common with the first embodiment is assigned the same reference numeral, and detailed explanation of the component is omitted. However, in the second embodiment, there exist a plurality of BTSs, so an identification number is added to the end of respective reference numerals of each BTS and its components; for example, the BTSs are described as BTSs 20-1 and 20-2, and their congestion monitoring units 22 are described as congestion monitoring units 22-1 and 22-2. The second embodiment differs from the first embodiment in an area subject to detection of a congestion state. Specifically, in the first embodiment, an object of the detection of a congestion state is a sector (a wireless band), and the RNC 10 detects which one of a congestion occurrence state or a non-congestion state a congestion state of each sector is. On the other hand, in the second embodiment, an object of the detection of a congestion state is a BTS, and the RNC 10 detects which one of the two states a congestion state of each BTS is.

A configuration of an RLC-retransmission-ratio threshold reference table is the same as in the first embodiment (see FIG. 6A), so explanation of the RLC-retransmission-ratio threshold reference table is omitted. FIG. 12 is a diagram illustrating an example of data storage in a congestion-state threshold reference table T3 held in a memory 20c-1 of the BTS 20-1. A congestion state of each BTS is defined by a buffer retention amount for packets that the BTS 20-1 receives from the RNC 10 (hereinafter, referred to as a "reception buffer retention amount"). As illustrated in FIG. 12, in the congestion-state threshold reference table T3, "60%" has been set as a "congestion occurrence threshold" indicating an upper limit threshold of a reception buffer retention amount of each BTS, and "20%" has been set as a "non-congestion threshold" indicating a lower limit threshold of the reception buffer retention amount. The congestion monitoring unit 22-1 of the BTS 20-1 monitors a reception buffer retention amount with a certain period (for example, with a period of 100 milliseconds). When a reception buffer retention amount of a BTS has become more than the congestion occurrence threshold of "60%" the certain number of times in a row (for example, in three consecutive periods), the congestion monitoring unit 22-1 determines that the BTS is in a "congestion occurrence state". On the other hand, while a BTS is in a "congestion occurrence state", when a reception buffer retention amount of the BTS has become equal to or less than the non-congestion threshold of "20%" the certain number of times in a row (for example, in three consecutive periods), the congestion monitoring unit 22-1 determines that the BTS has fallen into a "non-congestion state". Incidentally, respective set values in the congestion-state threshold reference table T3 can be arbitrarily changed according to the number of BTSs of which the reception buffer retention amount has become more than the congestion occurrence threshold (the upper limit threshold), a traffic amount of each BTS, or the capacity of a reception buffer, etc.

Subsequently, operation of the wireless communication system 1 in the second embodiment is explained with a focus on differences from that is in the first embodiment. In the present embodiment, an operating sequence of the wireless communication system 1 on execution of the rate control on the mobile station UE4 is explained particularly based on the assumption that a congestion state of the BTS 20-2 using sectors E and F illustrated in FIG. 11 as a communication area makes the transition from "non-congestion state" to "congestion occurrence state", and then makes the transition to "non-congestion state" again. FIG. 13 is a sequence diagram for explaining the operation of the wireless communication system 1 according to the second embodiment. In FIG. 13, the mobile station UE4 in the sector E out of the sectors E and F marked with diagonal lines is an object of transmission-rate reduction control in the present operating sequence.

FIG. 13 includes the same processes illustrated in FIG. 7 referenced for the explanation of the operation according to the first embodiment; therefore, a common step is assigned a reference numeral with the same last two numbers, and detailed explanation of the step is omitted. Specifically, processes at Steps S201 to S220 in FIG. 13 correspond to the processes at Steps S101 to S120 in FIG. 7, respectively.

At S205, the congestion-notification transmitting unit 23-2 transmits a congestion notification packet P2 to the RNC 10 in accordance with an instruction to transmit the congestion notification packet P2 (a dotted part in FIG. 13) from the congestion monitoring unit 22-2 (S205). In the congestion notification packet P2, a "congestion occurrence" state as a congestion state P2a and "BTS" as a congestion point P2b have been set. When the congestion-notification receiving unit 12 has received the congestion notification packet P2, the RNC 10 detects the occurrence of congestion by the receipt of the congestion notification packet P2. Then, the congestion-notification receiving unit 12 notifies the transmission-rate control unit 132 of the occurrence of congestion in the BTS 20-2 as a result of analysis of the congestion notification packet P2 (S206). When having received the notification, the transmission-rate control unit 132 detects that the BTS 20-2 is currently in a congestion occurrence state, and as a result, the mobile stations UE4 to UE6 held by the BTS 20-2 become candidates for a rate controlled object. Incidentally, also in the case of notification of a non-congestion state, the same process as in the above-described notification of a congestion occurrence state is performed (S217, S218).

As with the mobile station UE4, the mobile stations UE1 to UE3, UE5, and UE6 other than the mobile station UE4 are located in a cell of the BTS 20-2 being in the congestion occurrence state, so the mobile stations UE1 to UE3, UE5, and UE6 are rate controlled objects; however, their RLC retransmission ratios are not more than the upper limit threshold. Therefore, the transmission-rate control unit 132 of the RNC 10 does not perform the rate control on the other mobile stations UE1 to UE3, UE5, and UE6.

FIG. 14 is a diagram illustrating whether or not to execute the rate control at each of timings according to a congestion state of the BTS 20-2 and an RLC retransmission ratio of the mobile station UE4 in the second embodiment. As illustrated in FIG. 14, out of control timings t21 to t26 illustrated in FIG. 13, at the timings t21 and t26 at which a "congestion state of the BTS 20-2" is in a "non-congestion state" or the timings t21, t22, and t24 at which an "RLC retransmission ratio of the mobile station UE4" is "not more than the upper limit threshold", the rate control is not executed, and the rate control is executed at the timings t23 and t25 only. Namely, when a "congestion state of the BTS 20-2" is a "congestion occurrence" state and an "RLC retransmission ratio of the mobile station UE4" is "more than the upper limit threshold", the transmission-rate control unit 132 of the RNC 10 performs the control of reducing a transmission rate of a packet addressed to the mobile station UE4.

As explained above, in the wireless communication system 1 according to the second embodiment, the rate control on a mobile station with a high retransmission ratio can be executed and cancelled based on not only a congestion state of each sector but also a detected/notified congestion state of each BTS.

[c] Third Embodiment

Figure 15:
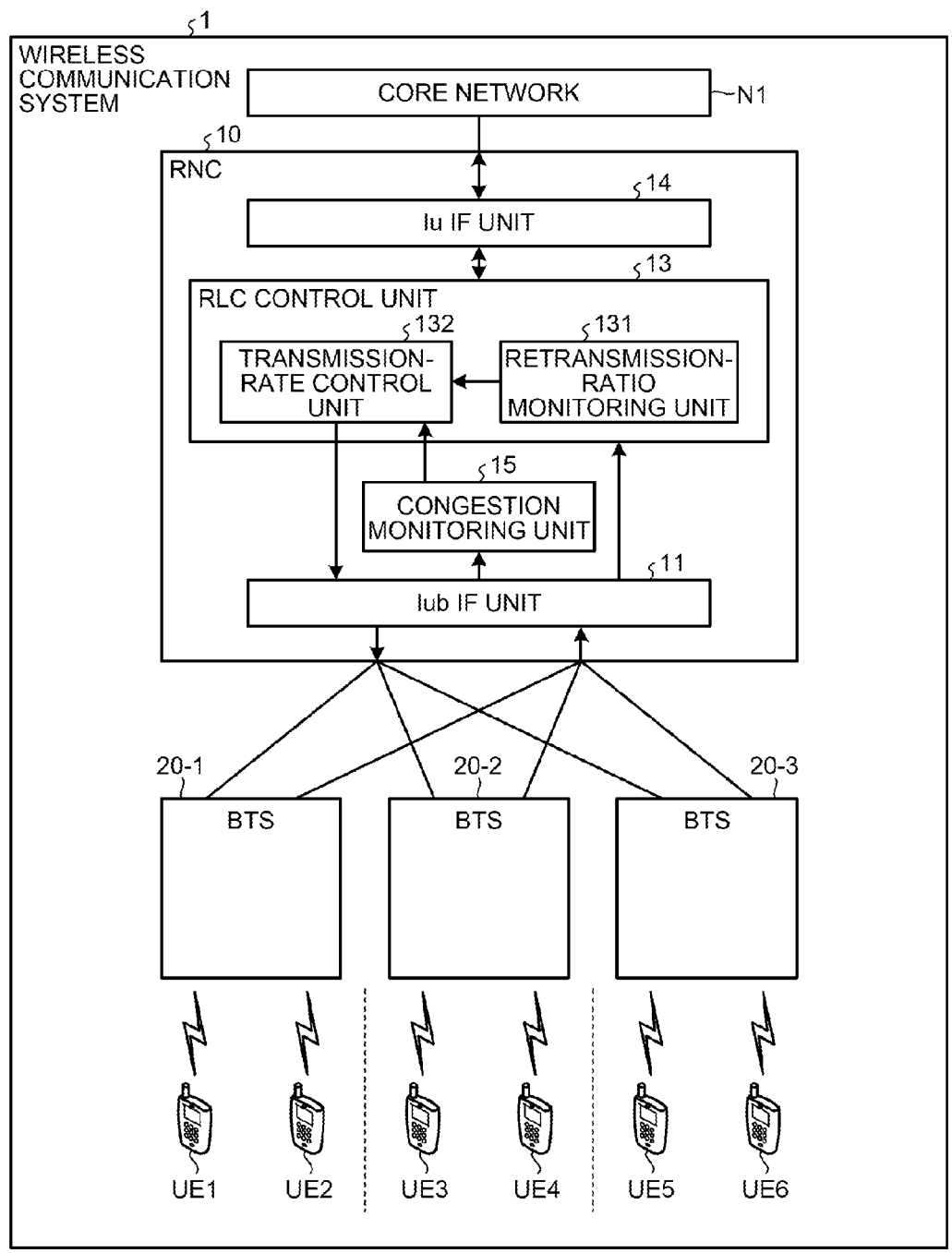
FIG. 15 is a diagram illustrating a functional configuration of a wireless communication system according to a third embodiment.

Subsequently, a third embodiment is explained. A wireless communication system according to the third embodiment has the same configuration as the wireless communication system in the first embodiment illustrated in FIG. 2, except that the RNC 10 includes a congestion monitoring unit 15 instead of the congestion-notification receiving unit 12 and monitors congestion of the RNC 10. FIG. 15 is a diagram illustrating a functional configuration of the wireless communication system 1 according to the third embodiment. As illustrated in FIG. 15, in the third embodiment, a component in common with the first embodiment is assigned the same reference numeral, and detailed explanation of the component is omitted. However, in the third embodiment, there exist the plurality of BTSs, so an identification number is added to the end of respective reference numerals of each BTS and its components; for example, the BTSs are described as BTSs 20-1, 20-2, and 20-3. The third embodiment differs from the first and second embodiments in an area subject to detection of a congestion state. Specifically, in the first embodiment, an object of the detection of a congestion state is a sector (a wireless band), and the RNC 10 detects which one of a congestion occurrence state or a non-congestion state a congestion state of each sector is. Furthermore, in the second embodiment, an object of the detection of a congestion state is a BTS, and the RNC 10 detects which one of the two states a congestion state of each BTS is. On the other hand, in the third embodiment, an object of the detection of a congestion state is an RNC unit, and the RNC 10 detects which one of the two states a congestion state of the RNC 10 is.

The RNC 10 according to the third embodiment is connected to a large number of (for example, about 100) subordinate BTSs including the BTSs 20-1, 20-2, and 20-3 by wired connections. The RNC 10 includes the Iub IF unit 11, the congestion monitoring unit 15, the RLC control unit 13, and the Iu IF unit 14. These components are connected so that they can input and output a signal or data unidirectionally or bidirectionally. The Iub IF unit 11 performs a process of transmitting a packet to a BTS and a process of receiving a packet from a BTS. The congestion monitoring unit 15 monitors a congestion state of the RNC 10, and, on the occurrence of congestion or when a congestion occurrence state is cancelled, notifies the transmission-rate control unit 132 of that effect.

The RLC control unit 13 includes the retransmission-ratio monitoring unit 131 and the transmission-rate control unit 132. The retransmission-ratio monitoring unit 131 monitors an RLC retransmission ratio of each mobile station, and notifies the transmission-rate control unit 132 of a result of comparison of the retransmission ratio with a certain threshold as a result of the monitoring. For example, the retransmission-ratio monitoring unit 131 presets an upper limit threshold and a lower limit threshold, and, when the retransmission ratio has become more than the upper limit threshold, notifies the transmission-rate control unit 132 of "more than the threshold". On the other hand, when the retransmission ratio has dropped from a state of being more than the threshold to a state of being equal to or less than the lower limit threshold, the retransmission-ratio monitoring unit 131 notifies the transmission-rate control unit 132 of "equal to or less than the threshold".

The transmission-rate control unit 132 controls a transmission rate of a mobile station with a high retransmission ratio based on information input from the congestion monitoring unit 15. When having been notified of a "congestion occurrence state" by the congestion monitoring unit 15, the transmission-rate control unit 132 performs rate control on a mobile station which is held by the RNC 10 and of which the retransmission ratio has become more than the upper limit threshold. In the same manner as in the first embodiment, this rate control is executed based on a ratio of the above-described connectivity rate to an upper limit. Furthermore, when having been notified of a "non-congestion state" by the congestion monitoring unit 15, the transmission-rate control unit 132 cancels the above-described rate control. The Iu IF unit 14 performs a process of transmitting a packet to the core network N1 and a process of receiving a packet transmitted from the core network N1.

A configuration of an RLC-retransmission-ratio threshold reference table is the same as in the first embodiment (see FIG. 6A), so explanation of the RLC-retransmission-ratio threshold reference table is omitted. FIG. 16 is a diagram illustrating an example of data storage in a congestion-state threshold reference table T4 held in the memory 10c of the RNC 10. A congestion state of each RNC is defined by a reception buffer retention amount for packets that the RNC 10 receives from the core network N1. As illustrated in FIG. 16, in the congestion-state threshold reference table T4, "50%" has been set as a "congestion occurrence threshold" indicating an upper limit threshold of a reception buffer retention amount of each RNC, and "10%" has been set as a "non-congestion threshold" indicating a lower limit threshold of the reception buffer retention amount. The congestion monitoring unit 15 of the RNC 10 monitors a reception buffer retention amount with a certain period (for example, with a period of 100 milliseconds). When the reception buffer retention amount has become more than the congestion occurrence threshold of "50%" set as the upper limit threshold the certain number of times in a row (for example, in three consecutive periods), the congestion monitoring unit 15 determines that the RNC 10 is in a "congestion occurrence state". On the other hand, while the RNC 10 is in the "congestion occurrence state", when the reception buffer retention amount has become equal to or less than the non-congestion threshold of "10%" set as the lower limit threshold the certain number of times in a row (for example, in three consecutive periods), the congestion monitoring unit 15 determines that the RNC 10 has fallen into a "non-congestion state". Incidentally, respective set values in the congestion-state threshold reference table T4 can be arbitrarily changed according to a traffic amount of the RNC 10 and the capacity of a reception buffer, etc.

Subsequently, operation of the wireless communication system 1 in the third embodiment is explained with a focus on differences from that is in the first embodiment. In the present embodiment, the operation of the wireless communication system 1 is explained particularly based on the assumption that a congestion state of the RNC 10 having the subordinate BTSs 20-1, 20-2, and 20-3 illustrated in FIG. 15 makes the transition from "non-congestion state" to "congestion occurrence state", and then makes the transition to "non-congestion state" again. Then, there is explained an operating sequence of the wireless communication system 1 on execution of the rate control on the mobile station UE5 located in a cell of the BTS 20-3. FIG. 17 is a sequence diagram for explaining the operation of the wireless communication system 1 according to the third embodiment. In FIG. 17, out of all mobile stations held by the RNC 10 marked with diagonal lines, the mobile station UE5 with a particularly-high RLC retransmission ratio is an object of transmission-rate reduction control in the present operating sequence.

The operation of the wireless communication system 1 in the third embodiment is the same as in the first embodiment, except that a unit which monitors a congestion state is changed from the congestion monitoring unit 22 of the BTS 20 (see FIG. 7) to the congestion monitoring unit 15 of the RNC 10. Namely, FIG. 17 includes the same processes illustrated in FIG. 7 referenced for the explanation of the operation according to the first embodiment; therefore, a common step is assigned a reference numeral with the same last two numbers, and detailed explanation of the step is omitted. Specifically, processes at Steps S301 to S304, S307 to S316, S319, and S320 in FIG. 17 correspond to the processes at Steps S101 to S104, S107 to S116, S119, and S120 illustrated in FIG. 7, respectively.

At S304, when the congestion monitoring unit 15 of the RNC 10 has detected occurrence of congestion through the monitoring of a congestion state, the congestion monitoring unit 15 notifies the transmission-rate control unit 132 of the occurrence of congestion in the RNC 10. When having received the notification, the transmission-rate control unit 132 detects that the RNC 10 is currently in a congestion occurrence state, and as a result, the mobile stations UE1 to UE6 held by the RNC 10 become candidates for a rate controlled object. In this manner, in the third embodiment, notification of a congestion state from the BTSs 20-1, 20-2, and 20-3 is not needed. Incidentally, also in the case of notification of a non-congestion state, the same process as in the above-described notification of a congestion occurrence state is performed (S316).

As with the mobile station UE5, the mobile stations UE1 to UE4 and UE6 other than the mobile station UE5 are located in an area under the RNC 10 being in the congestion occurrence state, so the mobile stations UE1 to UE4 and UE6 are rate controlled objects; however, their RLC retransmission ratios are not more than the upper limit threshold. Therefore, the transmission-rate control unit 132 of the RNC 10 does not perform the rate control on the other mobile stations UE1 to UE4 and UE6.

FIG. 18 is a diagram illustrating whether or not to execute the rate control at each of timings according to a congestion state of the RNC 10 and an RLC retransmission ratio of the mobile station UE5 in the third embodiment. As illustrated in FIG. 18, out of control timings t31 to t36 illustrated in FIG. 17, at the timings t31 and t36 at which a "congestion state of the RNC 10" is a "non-congestion" state or the timings t31, t32, and t34 at which an "RLC retransmission ratio of the mobile station UE5" is "not more than the upper limit threshold", the rate control is not executed, and the rate control is executed at the timings t33 and t35 only. Namely, as described above, when a "congestion state of the RNC 10" is a "congestion occurrence" state, and an "RLC retransmission ratio of the mobile station UE5" is "more than the upper limit threshold", the transmission-rate control unit 132 of the RNC 10 performs the control of reducing a transmission rate of a packet addressed to the mobile station UE5.

As explained above, in the wireless communication system 1 according to the third embodiment, the rate control on a mobile station with a high retransmission ratio can be executed and cancelled based on not only a congestion state of each sector or each BTS but also a detected/notified congestion state of each RNC.

Figure 19:
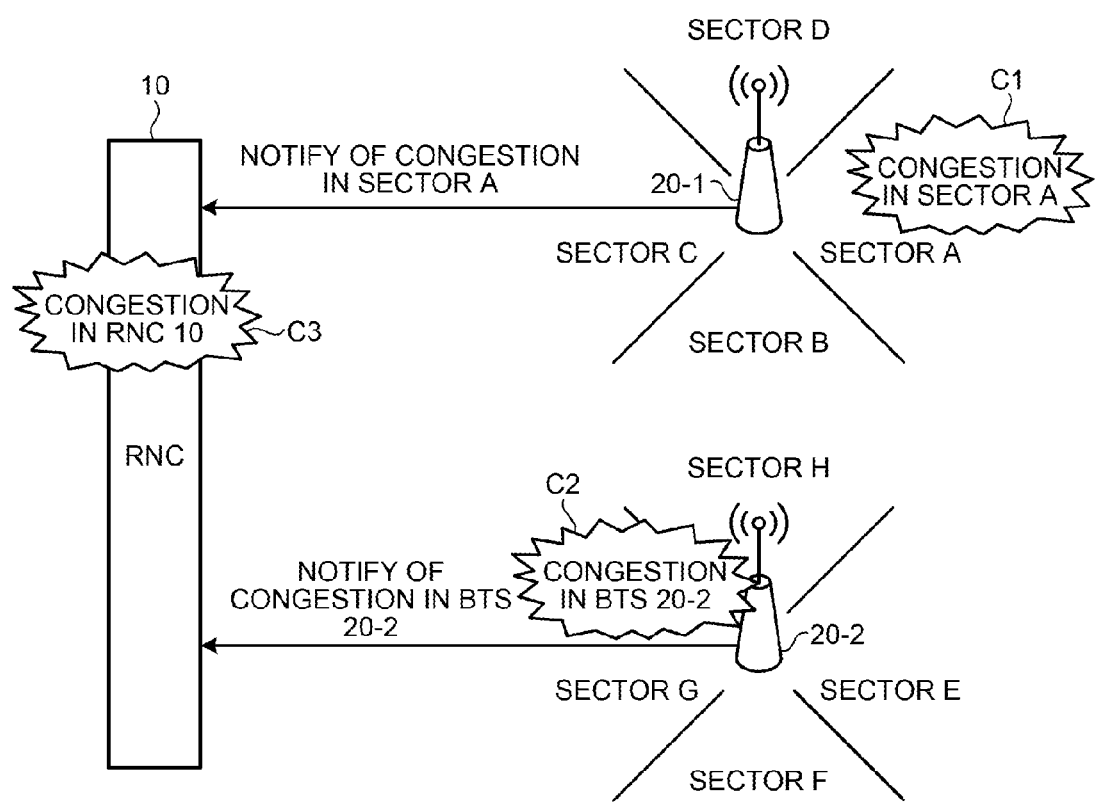
FIG. 19 is a diagram for explaining coverage for the rate control according to a congestion point.

As described above, in the wireless communication system 1, the congestion-notification receiving unit 12 detects the occurrence of congestion in each of sectors of the BTSs 20-1, 20-2, and 20-3 connected to the mobile stations UE1 to UE6 or each of the BTSs 20-1, 20-2, and 20-3 or the RNC 10. Namely, an object to be monitored for a congestion state before packet-rate reduction control can be arbitrarily selected and changed from any of on a sector-by-sector basis, on a BTS-by-BTS basis, and on an RNC-by-RNC basis, and a user of a mobile station subject to the rate control varies depending on which one is selected. FIG. 19 is a diagram for explaining coverage for the rate control according to a congestion point. As illustrated in FIG. 19, for example, when a sector A in a cell of the BTS 20-1 is congested (see C1), the wireless communication system 1 sets only a mobile station held in the sector A as an object of the rate control. Namely, even a mobile station held by the same BTS 20-1 is not set as a controlled object if the mobile station is located in any of sectors B, C, and D other than the sector A. Likewise, for example, when the BTS 20-2 is congested (see C2), the wireless communication system 1 sets mobile stations held in all sectors E to H formed by the BTS 20-2 as objects of the rate control. In other words, even a mobile station held by a BTS connected to the same RNC 10 is not set as a controlled object if the mobile station is located in a cell formed by the BTS 20-1 other than the BTS 20-2. Furthermore, when the RNC 10 is congested (see C3), all mobile stations held by the RNC 10 (mobile stations located in the sectors A to H) are objects of rate reduction control according to an RLC retransmission ratio.

Incidentally, in FIG. 19, there is illustrated an example where four sectors are formed in each of the BTSs 20-1 and 20-2; however, the number of sectors is not limited to four, and any value can be adopted.

[d] Fourth Embodiment

Figure 20:
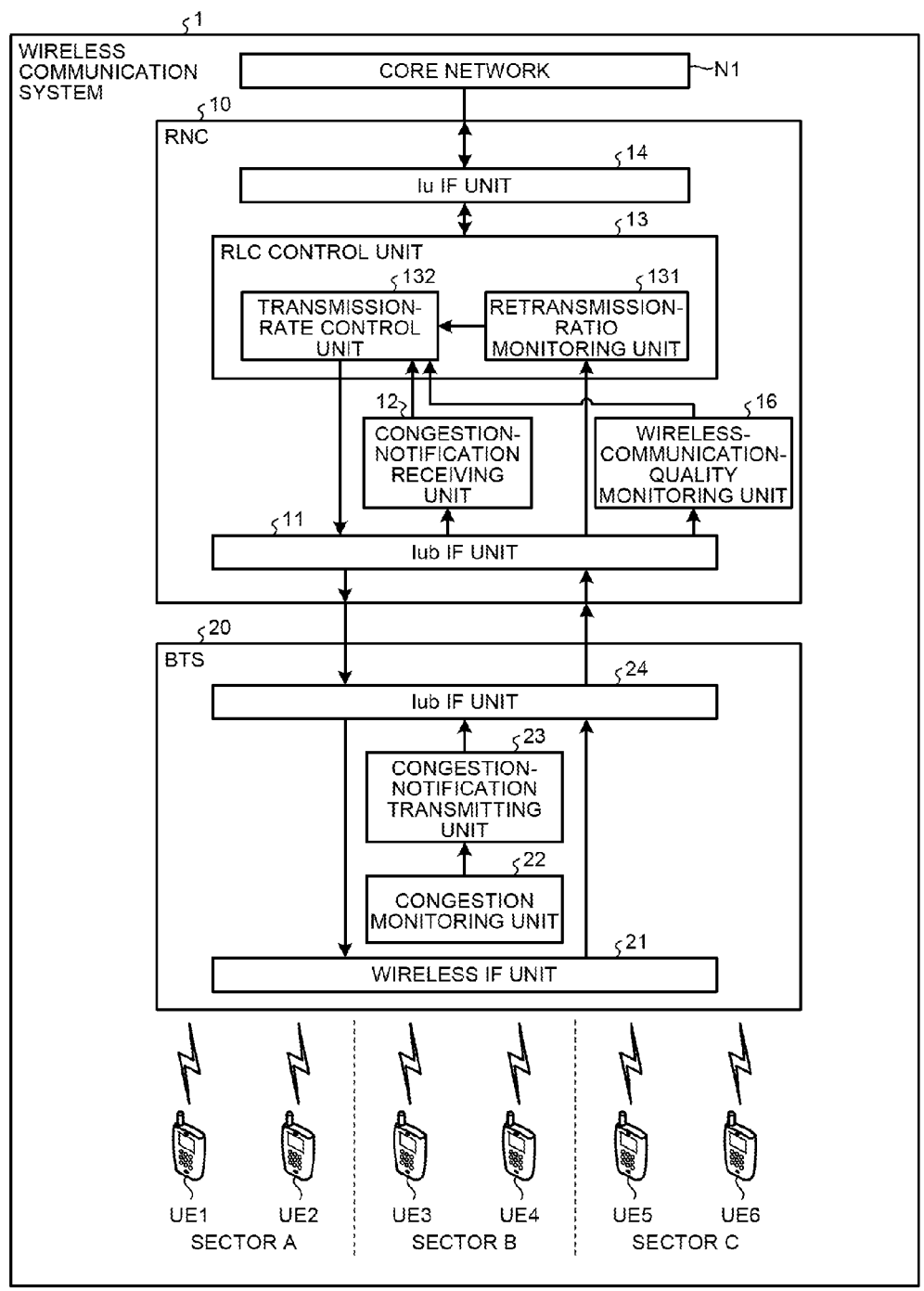
FIG. 20 is a diagram illustrating a functional configuration of a wireless communication system according to a fourth embodiment.

Subsequently, a fourth embodiment is explained. A wireless communication system according to the fourth embodiment has the same configuration as the wireless communication system in the first embodiment illustrated in FIG. 2, except that the RNC 10 further includes a wireless-communication-quality monitoring unit 16. FIG. 20 is a diagram illustrating a functional configuration of the wireless communication system 1 according to the fourth embodiment. As illustrated in FIG. 20, in the fourth embodiment, a component in common with the first embodiment is assigned the same reference numeral, and detailed explanation of the component is omitted. The fourth embodiment differs from the first embodiment in that the RNC 10 monitors quality of transmission between the BTS 20 and the mobile stations UE1 to UE6 (hereinafter, referred to as "wireless communication quality"). Specifically, in the first embodiment, the RNC 10 sets a mobile station with a retransmission ratio exceeding an upper limit threshold out of mobile stations in an area being in a congestion state as an object of the rate control. On the other hand, in the fourth embodiment, the RNC 10 does not set all mobile stations with retransmission ratios exceeding the upper limit threshold but performs control of excluding a mobile station with wireless communication quality equal to or more than an upper limit threshold from objects of the rate control.

The RNC 10 according to the fourth embodiment is connected to the plurality of subordinate BTSs including the BTS 20 by wired connections. The RNC 10 includes the Iub IF unit 11, the congestion-notification receiving unit 12, the RLC control unit 13, the Iu IF unit 14, and the wireless-communication-quality monitoring unit 16. These components are connected so that they can input and output a signal or data unidirectionally or bidirectionally. The Iub IF unit 11 performs a process of transmitting a packet to the BTS 20 and a process of receiving a packet from the BTS 20. The congestion-notification receiving unit 12 analyzes a congestion state and area information of an object to be monitored for the congestion state (for example, an identification number of a sector or a BTS) upon receipt of a congestion notification packet P3 from the BTS 20, and notifies the transmission-rate control unit 132 of a result of the analysis.

The RLC control unit 13 includes the retransmission-ratio monitoring unit 131 and the transmission-rate control unit 132. The retransmission-ratio monitoring unit 131 monitors an RLC retransmission ratio of each mobile station, and notifies the transmission-rate control unit 132 of a result of comparison of the retransmission ratio with a certain threshold as a result of the monitoring. For example, the retransmission-ratio monitoring unit 131 presets an upper limit threshold and a lower limit threshold, and, when the retransmission ratio has become more than the upper limit threshold, notifies the transmission-rate control unit 132 of "more than the threshold". On the other hand, when the retransmission ratio has dropped from a state of being more than the threshold to a state of being equal to or less than the lower limit threshold, the retransmission-ratio monitoring unit 131 notifies the transmission-rate control unit 132 of "equal to or less than the threshold". The transmission-rate control unit 132 controls a transmission rate of a mobile station with a high retransmission ratio based on information input from the congestion-notification receiving unit 12 and the retransmission-ratio monitoring unit 131. When having been notified of a "congestion occurrence state of the sector B" by the congestion-notification receiving unit 12, the transmission-rate control unit 132 performs rate control on a mobile station which is held in the sector B and of which the retransmission ratio has become more than the upper limit threshold. In the same manner as in the first embodiment, this rate control is executed based on a ratio of the above-described connectivity rate to an upper limit. Furthermore, when having been notified of a "non-congestion state of the sector B" by the congestion-notification receiving unit 12, the transmission-rate control unit 132 cancels the above-described rate control. The Iu IF unit 14 performs a process of transmitting a packet to the core network N1 and a process of receiving a packet transmitted from the core network N1.

The wireless-communication-quality monitoring unit 16 notifies the transmission-rate control unit 132, for example, when wireless communication quality (for example, Ec/NO: Energy chip/NOise) notified by a mobile station being monitored is equal to or more than an upper limit threshold, of "equal to or more than the threshold". On the other hand, when the wireless communication quality is equal to or less than a lower limit threshold, the wireless-communication-quality monitoring unit 16 notifies the transmission-rate control unit 132 of "equal to or less than the threshold". An indicator of wireless communication quality is not limited to the above-described Ec/NO, and, for example, a received signal strength indication (RSSI), channel state information (CSI), a channel quality indicator (CQI), and a signal-to-interference ratio (SIR), etc. can be used as an indicator of wireless communication quality.

Configurations of an RLC-retransmission-ratio threshold reference table and a congestion-state threshold reference table are the same as in the first embodiment (see FIGS. 6A and 6B), so explanation of the tables is omitted. FIG. 21 is a diagram illustrating an example of data storage in a wireless-communication-quality threshold reference table T5 held in the memory 10c of the RNC 10 in the fourth embodiment. As illustrated in FIG. 21, in the wireless-communication-quality threshold reference table T5, "α" indicating an upper limit threshold of wireless communication quality notified by a mobile station has been set, and "β" indicating a lower limit threshold of the wireless communication quality has been set.

The wireless-communication-quality monitoring unit 16 of the RNC 10 monitors, for example, quality of wireless communication between the mobile station UE3 and the BTS 20. When wireless communication quality as a result of the monitoring is equal to or more than the upper limit threshold "α", the wireless-communication-quality monitoring unit 16 excludes the mobile station UE3 from an object of the rate control; when the wireless communication quality is less than the upper limit threshold "α", the wireless-communicationquality monitoring unit 16 sets the mobile station UE3 as an object of the rate control. Furthermore, after the wireless communication quality has become equal to or more than the upper limit threshold "α", the wireless-communication-quality monitoring unit 16 continues to exclude the mobile station UE3 from an object of the rate control until the wireless communication quality has become equal to or less than the lower limit threshold "β". Namely, the mobile station UE3 is excluded from an object of transmission-rate reduction control in a period from when the wireless communication quality has become equal to or more than the upper limit threshold till when the wireless communication quality has become equal to or less than the lower limit threshold; however, during a period other than the above period, the mobile station UE3 is an object of transmission-rate reduction control. Incidentally, respective set values in the wireless-communication-quality threshold reference table T5 can be arbitrarily changed according to the number of mobile stations with wireless communication quality equal to or more than the upper limit threshold, an amount of traffic, or communication environment around the BTS 20 (for example, the presence or absence of interference or an obstacle and noise, etc.).

Subsequently, operation of the wireless communication system 1 in the fourth embodiment is explained with a focus on differences from that is in the first embodiment. In the present embodiment, the operation of the wireless communication system 1 is explained particularly based on the assumption that a congestion state of the RNC 10 having the subordinate BTS 20 illustrated in FIG. 20 makes the transition from "non-congestion state" to "congestion occurrence state", and then makes the transition to "non-congestion state" again. Then, there is explained an operating sequence of the wireless communication system 1 on execution of the rate control on the mobile station UE3 located in a cell of the BTS 20. FIG. 22 is a sequence diagram for explaining the operation of the wireless communication system 1 according to the fourth embodiment. In FIG. 22, the mobile station UE3 in the sector B marked with diagonal lines is an object of transmission-rate reduction control in the present operating sequence.

The operation of the wireless communication system 1 in the fourth embodiment is the same as in the first embodiment, except that the mobile station UE3 notifies the RNC 10 of wireless communication quality (Ec/N0). Namely, FIG. 22 includes the same processes illustrated in FIG. 7 referenced for the explanation of the operation according to the first embodiment; therefore, a common step is assigned a reference numeral with the same last two numbers, and detailed explanation of the step is omitted. Specifically, processes at Steps S401 to S409 and S414 to S420 in FIG. 22 correspond to the processes at Steps S101 to S109 and S114 to S120 illustrated in FIG. 7, respectively.

At S421, the mobile station UE3 notifies the RNC 10 of measured wireless communication quality of the mobile station UE3 via the BTS 20. When the RNC 10 has received the notification, the wireless-communication-quality monitoring unit 16 monitors a decrease or increase in the wireless communication quality of the mobile station UE3, and, when a value of the wireless communication quality has become equal to or more than the upper limit threshold α, notifies the transmission-rate control unit 132 of that effect (S422). Thereafter, the wireless-communication-quality notifying process by the mobile station UE3 continues to be performed (S423). After that, when the wireless communication quality which had become equal to or more than the upper limit threshold α has become equal to or less than the lower limit threshold β, the wireless-communication-quality monitoring unit 16 of the RNC 10 notifies the transmission-rate control unit 132 of that effect (S424).

As with the mobile station UE3, the mobile stations UE1, UE2, and UE4 to UE6 other than the mobile station UE3 are located in an area of the sector B being in the congestion occurrence state, so the mobile stations UE1, UE2, and UE4 to UE6 are rate controlled objects; however, their RLC retransmission ratios are not more than the upper limit threshold. Therefore, the transmission-rate control unit 132 of the RNC 10 does not perform the rate control on the other mobile stations UE1, UE2, and UE4 to UE6.

FIG. 23 is a diagram illustrating whether or not to execute the rate control at each of timings according to a congestion state of the sector B and an RLC retransmission ratio and wireless communication quality of the mobile station UE3 in the fourth embodiment. As illustrated in FIG. 23, out of control timings t41 to t46 illustrated in FIG. 22, at the timings t41, t42, and t46 at which a "congestion state of the sector B" is a "non-congestion" state or the timings t41 to t43 at which an "RLC retransmission ratio of the mobile station UE3" is "not more than the upper limit threshold" or the timings t42 to t44 at which "wireless communication quality of the mobile station UE3" is "equal to or more than the upper limit threshold", the rate control is not executed, and the rate control is executed at the timing t45 only. Namely, as described above, when a "congestion state of the sector B" is a "congestion occurrence" state, and an "RLC retransmission ratio of the mobile station UE3" is "more than the upper limit threshold", and also "wireless communication quality of the mobile station UE3" is "less than the lower limit threshold", the transmission-rate control unit 132 of the RNC 10 performs the control of reducing a transmission rate of a packet addressed to the mobile station UE3.

As explained above, in the wireless communication system 1 according to the fourth embodiment, the rate reduction control is executed by taking a congestion state and a retransmission ratio as well as quality of wireless communication between the mobile stations UE1 to UE6 and the BTS 20 into consideration. For example, when a packet addressed to the mobile station UE3 was lost in the BTS 20, retransmission may arise in packet transmission to the mobile station UE3 even if quality of wireless communication between the BTS 20 and the mobile station UE3 is good. It is not preferable that even in such a case, the RNC 10 reduces a transmission rate because of a high retransmission ratio from the viewpoint of achieving efficient line usage. Namely, when the wireless communication quality is good, an increase in the retransmission ratio is presumed to be just the transient elevation; therefore, even in such a case, if the RNC 10 reduces the transmission rate to the mobile station UE3, this causes a decrease in a ratio of an effective rate to the line bandwidth. Accordingly, in the present embodiment, when the wireless communication quality is equal to or more than the upper limit threshold, even if a retransmission ratio has exceeded the upper limit threshold, the RNC 10 does not change (increase or reduce) the transmission rate because it is more likely to be an instantaneous increase in the retransmission ratio, and performs packet transmission to the mobile station UE3 while maintaining the transmission rate. Consequently, the wireless communication system 1 can improve the line usage efficiency while suppressing processing load on the RNC 10 associated with the rate control. As a result, the wireless communication system 1 can achieve efficient line usage more effectively.

[e] Fifth Embodiment

Subsequently, a fifth embodiment is explained. In the above-described first to fourth embodiments, there is explained based on the assumption that W-CDMA is adopted as a wireless communication method; however, the transmission-rate control technology according to the above-described embodiments can also be applied to LTE. Namely, the transmission-rate control technology according to the above-described first to fourth embodiments can be implemented in not only the RNC 10 and the BTS 20 but also an eNB (evolutional Node B) having these functions in LTE.

Figure 24:
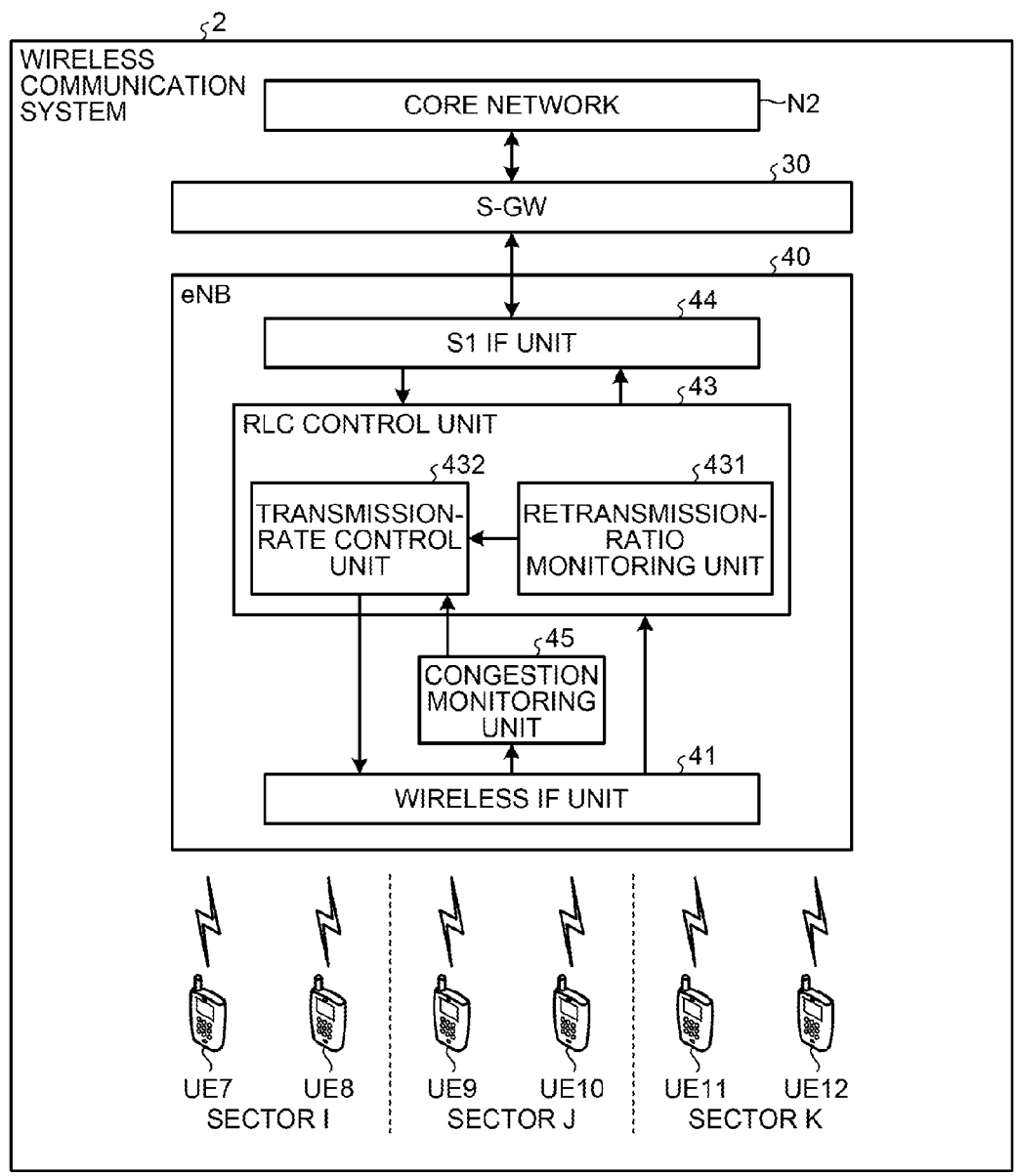
FIG. 24 is a diagram illustrating a functional configuration of a wireless communication system according to a fifth embodiment.

A wireless communication system according to the fifth embodiment has the same configuration as the wireless communication system in the third embodiment illustrated in FIG. 15, except that no BTS mediates communication with a mobile station and an S-GW (Serving-GateWay) mediates communication with a core network. Furthermore, an eNB in the fifth embodiment has the same configuration as the RNC 10 in the third embodiment illustrated in FIG. 15. FIG. 24 is a diagram illustrating a functional configuration of a wireless communication system 2 according to the fifth embodiment. As illustrated in FIG. 24, in the fifth embodiment, a component in common with the third embodiment is assigned a reference numeral with the same last number, and detailed explanation of the component is omitted. For example, a core network N2, an eNB 40, a wireless IF unit 41, an RLC control unit 43, and an S1 IF unit 44 in FIG. 24 correspond to the core network N1, the RNC 10, the Iub IF unit 11, the RLC control unit 13, and the Iu IF unit 14 illustrated in FIG. 15, respectively. Furthermore, a retransmission-ratio monitoring unit 431 and a transmission-rate control unit 432 correspond to the retransmission-ratio monitoring unit 131 and the transmission-rate control unit 132, respectively. Moreover, the mobile stations UE1 to UE6 correspond to mobile stations UE7 to UE12, respectively.

Figure 25:
FIG. 25 is a diagram illustrating an example of data storage in a congestion-state threshold reference table held in a memory of an eNB in the fifth embodiment.

The fifth embodiment differs from the third embodiment in an applied wireless communication method (system). For example, in the third embodiment, application of W-CDMA is assumed; on the other hand, in the fifth embodiment, transmission-rate control in the wireless communication system 2 with LTE applied is assumed. A configuration of an RLC-retransmission-ratio threshold reference table is the same as in the third embodiment (see FIG. 16), so explanation of the RLC-retransmission-ratio threshold reference table is omitted. FIG. 25 is a diagram illustrating an example of data storage in a congestion-state threshold reference table T6 held in a memory 40c of the eNB 40 in the fifth embodiment. Respective congestion states of sectors I, J, and K are defined by an amount of retention of packets in a transmission buffer that the eNB 40 uses on a sector-by-sector basis (hereinafter, referred to as a "transmission buffer retention amount"). As illustrated in FIG. 24, in the congestion-state threshold reference table T6, "80%" has been set as a "congestion occurrence threshold" indicating an upper limit threshold of a sector-specific transmission buffer retention amount, and "30%" has been set as a "non-congestion threshold" indicating a lower limit threshold of the transmission buffer retention amount.

A congestion monitoring unit 45 of the eNB 40 monitors a transmission buffer retention amount with a certain period (for example, with a period of 100 milliseconds). When a transmission buffer retention amount of a sector has become more than the congestion occurrence threshold of "80%" the certain number of times in a row (for example, in three consecutive periods), the congestion monitoring unit 45 determines that the sector is in a "congestion occurrence state". On the other hand, when a sector is in a "congestion occurrence state", if a transmission buffer retention amount of the sector has become equal to or less than the non-congestion threshold of "30%" the certain number of times in a row (for example, in three consecutive periods), the congestion monitoring unit 45 determines that the sector has fallen into a "non-congestion state". Incidentally, respective set values in the congestion-state threshold reference table T6 can be arbitrarily changed according to the number of sectors of which the transmission buffer retention amount has become more than the congestion occurrence threshold (the upper limit threshold), a traffic amount of each sector, or the capacity of a transmission buffer, etc.

Figure 26:
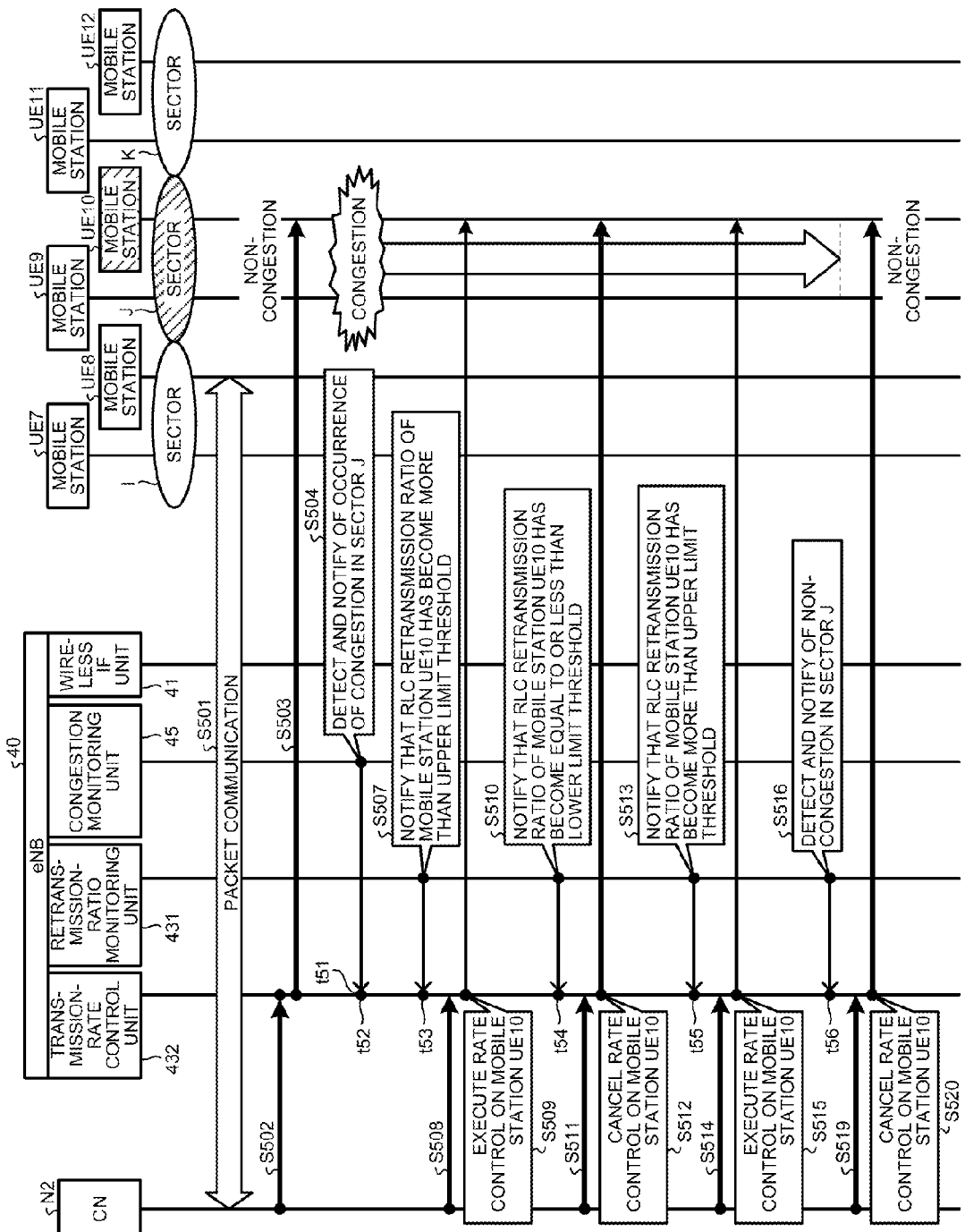
FIG. 26 is a sequence diagram for explaining operation of the wireless communication system according to the fifth embodiment.

Subsequently, operation of the wireless communication system 2 in the fifth embodiment is explained with a focus on differences from that is in the third embodiment. In the present embodiment, an operating sequence of the wireless communication system 2 on execution of the rate control on the mobile station UE10 (see FIG. 24) is explained particularly based on the assumption that a congestion state of the sector J illustrated in FIG. 24 makes the transition from "non-congestion state" to "congestion occurrence state", and then makes the transition to "non-congestion state" again. FIG. 26 is a sequence diagram for explaining the operation of the wireless communication system 2 according to the fifth embodiment. In FIG. 26, the mobile station UE10 in the sector J marked with diagonal lines is an object of transmission-rate reduction control in the present operating sequence.

FIG. 26 includes the same processes illustrated in FIG. 17 referenced for the explanation of the operation according to the third embodiment; therefore, a common step is assigned a reference numeral with the same last two numbers, and detailed explanation of the step is omitted. Specifically, processes at Steps S501 to S504, S507 to S516, S519, and S520 in FIG. 26 correspond to the processes at Steps S301 to S304, S307 to S316, S319, and S320 illustrated in FIG. 17, respectively.

At S504, when the congestion monitoring unit 45 of the eNB 40 has detected occurrence of congestion in the sector J through the monitoring of a congestion state, the congestion monitoring unit 45 notifies the transmission-rate control unit 432 of the occurrence of congestion. When having received the notification, the transmission-rate control unit 432 detects that the sector J is currently in a congestion occurrence state, and as a result, the mobile stations UE9 and UE10 located in the sector J become candidates for a rate controlled object. Incidentally, also in the case of notification of a non-congestion state, the same process as in the above-described notification of a congestion occurrence state is performed (S516).

As with the mobile station UE10, the mobile station UE9 out of the mobile stations UE7 to UE9, UE11, and UE12 other than the mobile station UE10 is located in the sector J being in the congestion occurrence state, so the mobile station UE9 is a rate controlled object; however, an RLC retransmission ratio of the mobile station UE9 is not more than the upper limit threshold. Therefore, the transmission-rate control unit 432 of the eNB 40 does not perform the rate control on the mobile station UE9.

FIG. 27 is a diagram illustrating whether or not to execute the rate control at each of timings according to a congestion state of the sector J and an RLC retransmission ratio of the mobile station UE10 in the fifth embodiment. As illustrated in FIG. 27, out of control timings t51 to t56 illustrated in FIG. 26, at the timings t51 and t56 at which a "congestion state of the sector J" is a "non-congestion" state or the timings t51, t52, and t54 at which an "RLC retransmission ratio of the mobile station UE10" is "not more than the upper limit threshold", the rate control is not executed, and the rate control is executed at the timings t53 and t55 only. Namely, when a "congestion state of the sector J" is a "congestion occurrence" state, and an "RLC retransmission ratio of the mobile station UE10" is "more than the upper limit threshold", the transmission-rate control unit 432 of the eNB 40 performs the control of reducing a transmission rate of a packet addressed to the mobile station UE10.

As explained above, according to the wireless communication system 2 according to the fifth embodiment, not only in the wireless communication system 1 adopting W-CDMA as a wireless communication method but also in the wireless communication system 2 adopting LTE, the rate control on a mobile station with a high retransmission ratio can be executed and cancelled based on a detected/notified congestion state of each sector.

Variation 1

The wireless communication system 2 according to the fifth embodiment can adopt modified forms described below. For example, in the fifth embodiment, the eNB 40 determines a congestion state of each sector; in a variation 1, a congestion state of each eNB 40 is determined. FIG. 28 is a diagram illustrating an example of data storage in a congestion-state threshold reference table T7 held in the memory 40c of the eNB 40 in the variation 1 of the fifth embodiment. A congestion state of the eNB 40 is defined by an amount of retention of packets in a reception buffer for packets transmitted from an S-GW 30 (see FIG. 24) to the eNB 40 (hereinafter, referred to as a "reception buffer retention amount"). As illustrated in FIG. 28, in the congestion-state threshold reference table T7, "60%" has been set as a "congestion occurrence threshold" indicating an upper limit threshold of an eNB-specific reception buffer retention amount, and "20%" has been set as a "non-congestion threshold" indicating a lower limit threshold of the reception buffer retention amount.

The congestion monitoring unit 45 of the eNB 40 monitors a reception buffer retention amount with a certain period (for example, with a period of 100 milliseconds). When a reception buffer retention amount of an eNB has become more than the congestion occurrence threshold of "60%" the certain number of times in a row (for example, in three consecutive periods), the congestion monitoring unit 45 determines that the eNB is in a "congestion occurrence state". On the other hand, when an eNB is in a "congestion occurrence state", if a reception buffer retention amount of the eNB has become equal to or less than the non-congestion threshold of "20%" the certain number of times in a row (for example, in three consecutive periods), the congestion monitoring unit 45 determines that the eNB has fallen into a "non-congestion state". Incidentally, respective set values in the congestion-state threshold reference table T7 can be arbitrarily changed according to a traffic amount of the eNB 40 or the capacity of a reception buffer, etc.

Incidentally, operation of the wireless communication system 2 according to the variation 1 is the same as the wireless communication system 2 in the fifth embodiment, so explanation of the operation of the wireless communication system 2 according to the variation 1 is omitted. As described above, in the wireless communication system 2 according to the variation 1, the rate control on a mobile station with a high retransmission ratio can be executed and cancelled based on not only a congestion state of each sector but also a detected/notified congestion state of each eNB.

Incidentally, in the above-described embodiments, the RNC 10 of the wireless communication system 1 starts the rate control when an RLC retransmission ratio has become more than the upper limit threshold, and cancels the started rate control when the RLC retransmission ratio has become equal to or less than the lower limit threshold. However, the RNC 10 can be configured not to make an alternative decision of whether or not to execute the rate control based on whether an RLC retransmission ratio has become more than a threshold as described above (see FIG. 6A) but to change a rate-control ratio stepwise according to a value of RLC retransmission ratio. For example, the higher the RLC retransmission ratio is, the further the RNC 10 reduces the rate by the rate control; the lower the RLC retransmission ratio is, the less the RNC 10 reduces the rate by the rate control. For example, with respect to a mobile station with an RLC retransmission ratio of "50%", the transmission-rate control unit 132 performs the rate control at a rate-control ratio of "30%", thereby reducing the transmission rate so that a reduction of the rate is "70 (=100–30) %". Furthermore, with respect to a mobile station with an RLC retransmission ratio of "30%", the transmission-rate control unit 132 performs the rate control at a rate-control ratio of "50%", thereby reducing the transmission rate so that a reduction of the rate is "50 (=100–50) %". Moreover, with respect to a mobile station with an RLC retransmission ratio of "10%", the transmission-rate control unit 132 performs the rate control at a rate-control ratio of "80%", thereby reducing the transmission rate so that a reduction of the rate is "20 (=100–80) %". This allows the precise rate control according to a state of retransmission to each mobile station held by the wireless communication system 1, and the line usage efficiency is improved further.

Alternatively, the congestion monitoring unit 22 of the BTS 20 can be configured to monitor a degree of congestion in each sector and change a rate-control ratio stepwise according to the degree of congestion (hereinafter, referred to as a "congestion level"). For example, the higher the congestion level is, the further the RNC 10 reduces the rate by the rate control; the lower the congestion level is, the less the RNC 10 reduces the rate by the rate control. Also in this modified form, the precise rate control according to a state of congestion in each sector formed under the wireless communication system 1 can be achieved by stepwise control of a rate-control ratio according to a congestion level. As a result, the line usage efficiency is improved further. Furthermore, the transmission-rate control unit 132 of the RNC 10 can be configured to decide a rate-control ratio stepwise by combination of the above-described rate control according to a state of retransmission and the rate control according to a state of congestion. This allows the RNC 10 to perform the rate control further based on an actual condition in accordance with communication environment of a sector in which a mobile station is located. As a result, the adaptability of the wireless communication system 1 is improved.

Moreover, in the above-described embodiments, the wireless communication systems 1 and 2 set only an area in which congestion has occurred as an object of the rate control, and exclude any sector, BTS, RNC, and eNB in which congestion has not occurred from an object of the rate control. However, the wireless communication systems 1 and 2 do not always have to exclude all mobile stations within an area being in a non-congestion state from an object of the rate control, and can weight retransmission ratios of these mobile stations by a certain coefficient a (0≤a<1). For example, the retransmission-ratio monitoring unit 131 of the RNC 10 multiplies RLC retransmission ratios of mobile stations located in the sectors B, C, and D being in a non-congestion state in FIG. 19 by "0.5", but uses an RLC retransmission ratio of a mobile station located in the sector A being in a congestion occurrence state as it is. Alternatively, the retransmission-ratio monitoring unit 131 performs the weighting by multiplying RLC retransmission ratios of all mobile stations located in the sector A being in the congestion occurrence state by a certain coefficient b (1<b, for example, b=2.0).

According to the above-described form, even if a mobile station within an area being in a non-congestion state and a mobile station within an area being in a congestion state have the same RLC retransmission ratio, the RLC retransmission ratio of the mobile station within the area being in the congestion state is relatively prone to exceed the upper limit threshold. As a result, the mobile station within the area being in the congestion state is likely to be selected as an object of the transmission rate control. Furthermore, even when a mobile station is located in an area being in a non-congestion state, if the mobile station has an extremely high retransmission ratio, transmission-rate reduction control on the mobile station is allowed. Consequently, the RNC 10 can prevent possible future congestion. Therefore, as with the above-described embodiments, it is possible to achieve efficient usage of line bands.

Furthermore, in the above-described embodiments, there is explained based on the assumption that a mobile station is a cell-phone, a smartphone, or a personal digital assistant (PDA); however, the present invention can be applied to not only such mobile stations but also various communication devices that perform packet transmission and reception with a BTS or an eNB. A packet to be retransmitted is not limited to a TCP/IP (Transmission Control Protocol/Internet Protocol) packet, and the above-described embodiments can be also applied to any other PDU, such as a frame in the data link layer or a cell in an asynchronous transfer mode (ATM).

Moreover, in the above-described embodiments and variation, components of the wireless communication system 1 do not always have to be physically configured as illustrated in the drawings. Namely, the specific forms of division and integration of components of each device are not limited to those illustrated in the drawings, and all or some of the components can be configured to be functionally or physically divided or integrated in arbitrary units depending on respective loads and use conditions, etc. For example, the Iub IF unit 11 and the congestion-notification receiving unit 12 or the congestion-notification transmitting unit 23 and the Iub IF unit 24 illustrated in FIG. 2 can be integrated into one unit. Furthermore, the transmission-rate control unit 132 can contain the function of the retransmission-ratio monitoring unit 131. Or, on the contrary, the transmission-rate control unit 132 of the RNC 10 can be divided, for example, into a part that determines whether or not to execute the rate control based on the presence or absence of congestion and an RLC retransmission ratio and a part that actually controls a transmission rate to be reduced in accordance with a result of the determination. Moreover, the memories 10*c* and 20*c* can be externally connected to the RNC 10 and the BTS 20 via a network or a cable as external devices.

Furthermore, in the above description, respective configurations and operations in the embodiments and variation are explained. However, the wireless communication systems 1 and 2 according to the embodiments can further include a component unique to the other embodiments and variation. Moreover, combination of the embodiments and variation is not limited to a combination of two, and can adopt any form, such as a combination of three or more. For example, the rate control technology taking wireless communication quality into consideration according to the fourth embodiment can be applied to not only the first embodiment but also the other second, third, and fifth embodiments and the variation 1.

According to one aspect of a communication control device discussed in the above embodiments, it is possible to improve the line usage efficiency.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication control device comprising:
a processor configured to execute a process including:
detecting occurrence of congestion in an area in which a mobile station is located;
first monitoring a ratio of retransmission of a packet to the mobile station; and
performing control of changing a transmission rate of the packet to the mobile station according to the retransmission ratio when the congestion occurrence has been detected at the detecting.

2. The communication control device according to claim 1, wherein
the performing includes performing the control on the mobile station so that the higher the retransmission ratio, the lower the transmission rate.

3. The communication control device according to claim 1, wherein
the detecting includes detecting occurrence of congestion in each sector of a base station connected to the mobile station or in the base station or in the communication control device.

4. The communication control device according to claim 1, wherein
the process further includes second monitoring quality of wireless communication between the mobile station and a base station connected to the mobile station, and
the performing includes performing control of maintaining the transmission rate of the packet to the mobile station when the wireless communication quality is equal to or more than a certain value.

5. A wireless communication system comprising:
a communication control device; and
a base station that communicates with the communication control device, wherein
the base station includes a processor configured to execute a process including notifying the communication control device of occurrence of congestion in an area in which a mobile station is located, and
the communication control device includes:
a processor configured to execute a process including:
detecting the congestion occurrence by the notification from the base station;
monitoring a ratio of retransmission of a packet to the mobile station; and
performing control of changing a transmission rate of the packet to the mobile station according to the retransmission ratio when the congestion occurrence has been detected at the detecting.

6. A wireless communication method comprising:
detecting occurrence of congestion in an area in which a mobile station is located;
monitoring a ratio of retransmission of a packet to the mobile station; and performing control of changing a transmission rate of the packet to the mobile station according to the retransmission ratio when the congestion occurrence has been detected.

\* \* \* \* \*